United States Patent [19]
Brett

[11] Patent Number: 5,450,500
[45] Date of Patent: Sep. 12, 1995

[54] HIGH-DEFINITION DIGITAL VIDEO PROCESSOR

[75] Inventor: Steven Brett, Kent, England

[73] Assignee: Pandora International Ltd., England

[21] Appl. No.: 45,560

[22] Filed: Apr. 9, 1993

[51] Int. Cl.$^6$ ............................................. G06K 9/36
[52] U.S. Cl. ................................. 382/162; 382/274; 348/649
[58] Field of Search ................. 348/22, 28, 520, 523, 348/527, 538, 649, 651; 395/131; 382/42, 41

[56] References Cited

U.S. PATENT DOCUMENTS

| | | | |
|---|---|---|---|
| 4,127,869 | 11/1978 | Millward | 358/54 |
| 4,184,177 | 1/1980 | Millward | 358/214 |
| 4,393,399 | 7/1983 | Gast et al. | 358/80 |
| 4,464,674 | 8/1984 | Schulz et al. | 358/21 R |
| 4,525,736 | 6/1985 | Korman | 358/28 |
| 4,727,425 | 2/1988 | Mayne et al. | 348/523 |
| 4,811,084 | 3/1989 | Belmares-Sarabia et al. | 358/22 |
| 4,823,184 | 4/1989 | Belmares-Sarabia | 358/27 |
| 4,862,251 | 8/1989 | Belmares-Sarabia et al. | 358/22 |
| 4,956,704 | 9/1990 | Yamada | 348/538 |
| 5,051,928 | 9/1991 | Gruters | 395/131 |
| 5,130,789 | 7/1992 | Dobbs et al. | 348/520 |
| 5,151,953 | 9/1992 | Landeta | 382/42 |
| 5,255,083 | 10/1993 | Capitant et al. | 348/527 |
| 5,305,094 | 4/1994 | Belmares-Sarabia | 348/651 |
| 5,313,275 | 5/1994 | Daly et al. | 348/592 |

FOREIGN PATENT DOCUMENTS 1268936 3/1972 United Kingdom.
2073993 10/1981 United Kingdom.

Primary Examiner—Yon J. Couso
Attorney, Agent, or Firm—Ostrolenk, Faber, Gerb & Soffen

[57] ABSTRACT

A digital video processor which is usable as a secondary digital color processor (DCP) with standard-definition digital telecines and is also compatible with high-definition television systems, for correcting video color and other attributes such as pixel location and sharpness. The disclosed video processor has an architecture in which only the pixels and/or regions of a video picture to be modified have any processing applied to them, so that most pixels, which are unmodified, remain free from any potential corruption. It identifies pixels to be modified by means of lookup tables which can be loaded for each frame with data indicating attributes such as hue, saturation, and luminance values or ranges which are to be present in a pixel if that pixel is to be selected for modification, the pixel's attributes being applied to each lookup table as an address. The DCP has multiple channels, with precedence logic to control the priority order of the channels, in order to apply only one particular set of modification increments associated with only one channel, in the event that more than one set of selection attributes are applicable to a given pixel. The system is capable of standard- or reduced-definition modification of portions within a high-definition picture.

32 Claims, 18 Drawing Sheets

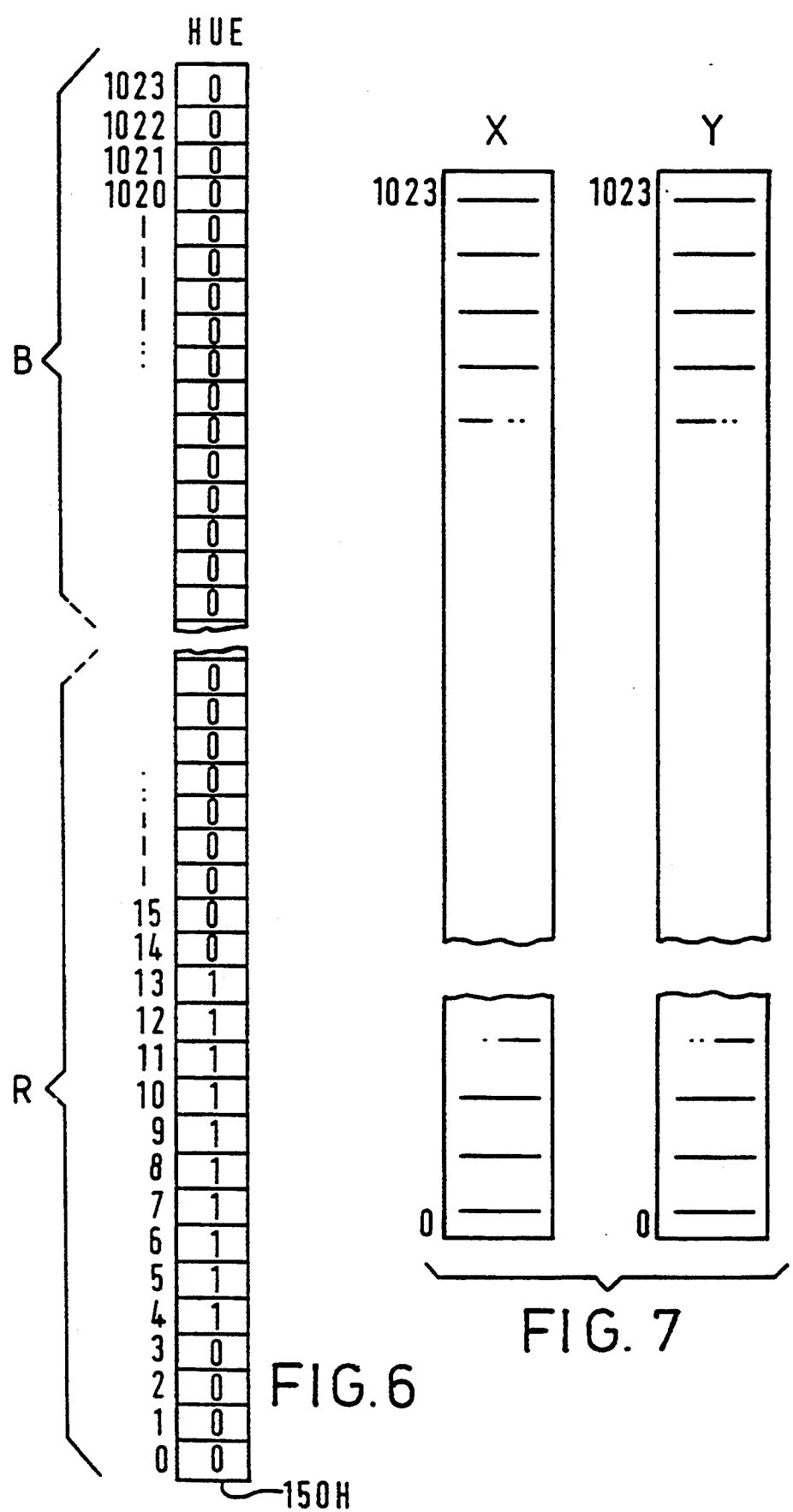

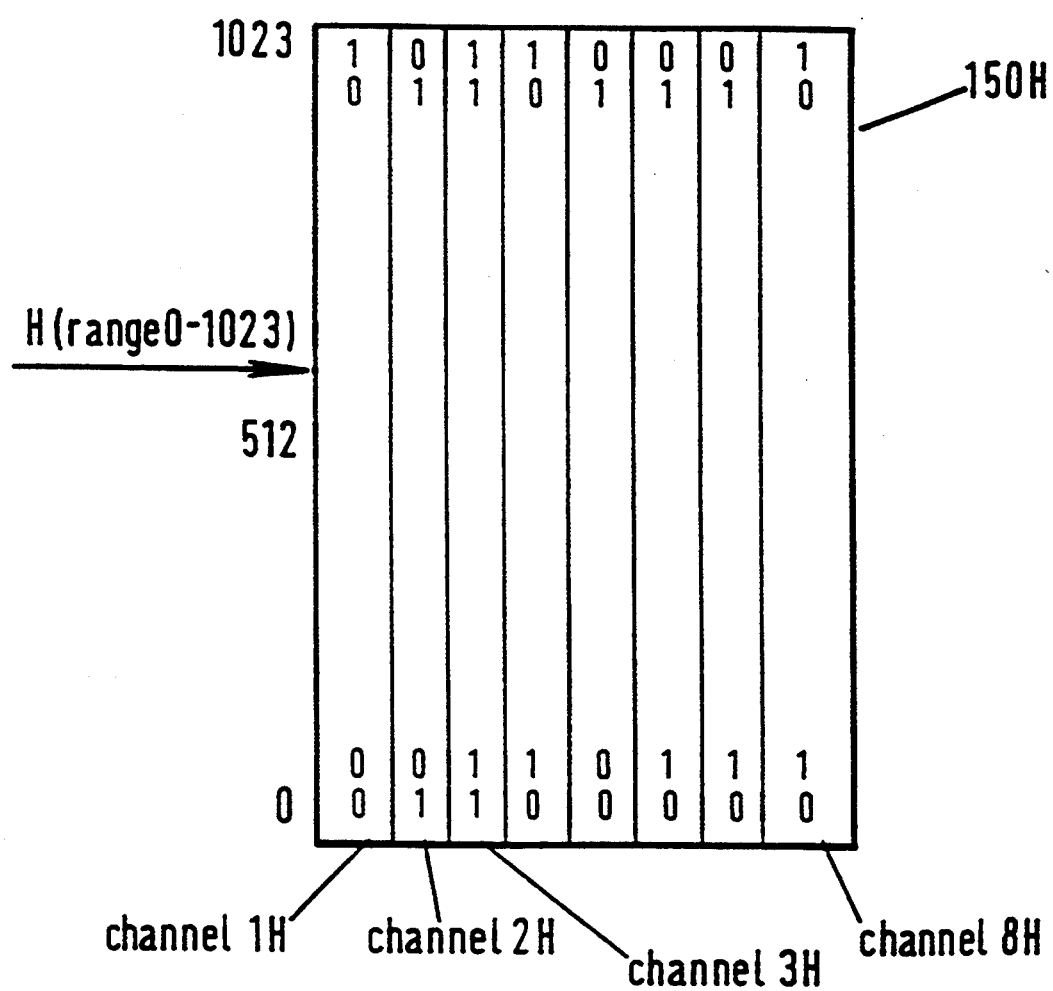

HDCP CARD RACK DETAILS

HIGH-DEFINITION DIGITAL VIDEO PROCESSOR

BACKGROUND OF THE INVENTION

1. Field of the Invention

The present invention relates to a digital video processor, and more particularly to a secondary digital color processor (DCP) which is usable with modern standard-definition digital telecines and is also compatible with high-definition television systems, for correcting video color and for other purposes.

2. Background Art

Telecines and external secondary color correctors (ESCC's) are used for the production of high-quality television pictures in a post-production television studio environment. The highest quality pictures normally originate from motion picture film, normally 35 mm film. These pictures are transcribed to video on a telecine, such as the Rank Cintel MkIII, the Rank Cintel URSA, or the BTS FDL90. Telecine machines convert the picture to a digital format and contain processing elements to enable simple manipulation of the color reproduction of the resulting images.

This sort of color manipulation may also be performed by an external analog system such as the RCA Chromacomp or its derivatives. This simple RCA-type color processing has the limited capability of, for example, intensifying the red component, over the entire picture, in all colors that have a red component. However, it is incapable of, for example, altering only the dark reds and leaving the light reds unchanged.

Over the years, improved ESCC's such as the PRISM from Encore Video Industries, Inc., of California, have emerged. The PRISM is an analog device which is capable of more selective color adjustment than the RCA Chromacomp. Other analog ESCC's are the Da Vinci, and the "Sunburst" made by Corporate Communications Consultants.

Color correctors have also been used for many years for tape-to-tape correction. The output of one videotape recorder (VTR) is processed by the ESCC, whose output is then recorded by another VTR.

ESCC's were traditionally analog, but now some color correctors are available that are partly or fully digital. The output of most modern telecines is digital.

Analog color correctors have several problems. Since a logical way to interconnect the telecine to the color corrector is to connect the output of the telecine to the input of the color corrector, it has normally been necessary to convert the digital signal to analog, apply the color correction, and then convert the corrected signal back to digital for storage or further processing. The conversion from digital to analog and back again causes degradation, and is therefore undesirable.

This phenomenon is most easily visible when one feeds a color signal through a color corrector with all of the controls set to zero (which in theory, should not change the colors). When one compares the output of the color corrector with a signal which bypasses the color corrector, quite often, there will be a difference between these two signals, which will become apparent when the two images are viewed "split-screen".

One reason for this discrepancy is that the signals in the electronic signal path (particularly in analog) are unintentionally modified due to the imperfections of real electronic circuits.

Another reason is that since the color corrector is an analog device, it will suffer from drift, which is inevitable in analog devices. Drift originates from many sources, one of which is temperature.

A third reason for the visible differences is noise. This noise may be visible as a change in level (and therefore color) or a difference in texture of a given flat color bar.

Even if, as has occasionally been done, the signals are processed in a totally digital domain, there have been degradations.

One reason may be digital "rounding", such that a color passing through a color corrector unintentionally becomes slightly modified, compared with the input.

Further, in known color correction systems (particularly digital systems), discontinuities occur. This happens where colors below a given limit are to remain unmodified, but colors above that limit are to be modified. If the picture to be modified contains an increasing ramp of that color, then the portion of the picture around the limit will show an unnatural discontinuity when it is color-corrected.

The known color-correction devices will be discussed further below, in the context of the following discussion of their use with telecine devices.

Referring first to FIG. 1, there is seen a schematic block diagram of the most basic type of stand-alone telecine 20, which is usable to broadcast a film directly over the air in real time. A film transport 21 runs a film 22 past a CRT scanner 24, which incorporates photomultipliers for generating red, green, and blue component signals designated $R_v$, $G_v$, and $B_v$. Gain, lift and gamma of the three signals are adjusted by a processor 26, and color is adjusted by a processor 28. Simple overall picture adjustments such as lightening and darkening are provided by a local control panel 30. Adjustments are performed live, as the film is broadcast. The local control panel 30 also contains controls such as a START control for the film transport and an ON control for the CRT scanner. A disadvantage of this basic system having only the foregoing components is that, in order to provide interlace for producing a conventional broadcast signal, it is necessary for the lines in each film frame to be scanned non-sequentially, that is, lines 1, 3, 5, ..., followed by lines 2, 4, 6 ...

An improvement upon the foregoing basic system, developed in the late 1970's, is the addition of a store 32, also shown in FIG. 1. The store improves the scanning process, by permitting the lines of each frame to be scanned sequentially, and then read out of the store with interlace. This feature was patented by Rank Cintel in British patents 1,542,213 and 1,535,563, and equivalent U.S. Pat. Nos. 4,184,177 and 4,127,869, respectively.

An improvement shown in FIG. 2 is a controller/programmer 30', which as shown is an accessory for the telecine 20', although it could conceivably be built into the telecine 20'. The controller/programmer 30' provides a control panel for the processors 26, 28, and the film transport 21. It further includes a programming function, whereby an operator can rehearse, slowly, the optimum grading and picture adjustments for each scene in the film, which the programmer stores. A key feature is that the programmer is driven by time code, or by film footage, so it can tell one scene from another by the time code or by the position of the film.

One example of a controller/programmer is the POGLE telecine controller/programmer manufactured by Pandora International Ltd., which is designed for use with a range of telecine machines. It is capable of providing a large number of control signals simultaneously, for example 96 control channels, either analog (a voltage within a predeterminable range) or digital. The channels can be used to control a telecine and/or other peripheral devices, such as noise reducers, VTR's, still stores, mixers, and color correctors (such as the DCP disclosed herein).

Another example of a controller/programmer is the "Rainbow" system of Corporate Communications Consultants.

A further improvement, shown in FIG. 3, is the external secondary color corrector (ESCC) 34. Examples are the RCA Chromacomp, the PRISM, and the Da Vinci. ESCC's can be either digital or analog. Instead of simple RGB control, which only gives the ability to add or subtract red, green, and blue, everywhere in the picture, this advanced generation of ESCC's provides 6-or-more-channel color control. That is, for example, 6 separate colors can be selected and then modified, without modifying any other colors. The ESCC 34 is controlled by the controller/programmer 30''.

The ESCC 34 takes its inputs from the color processor 28 in the telecine 20'', and provides its outputs to the store 32. The reason for this signal path is that the store is usually capable of handling lower bandwidth (i.e., fewer bits or lower resolution) than the signals from the processor 28, so the number of bits is reduced, for example, by rounding, before the signals are stored. For example, the URSA's output is medium-bandwidth "4:2:2" color (D-1 format). Thus, taking the input to the ESCC 34 from the output of the processor 28 allows the ESCC to operate on a higher-bandwidth signal than if it operated on the output from the store.

The trend is for telecines to be made digital and to incorporate improved color correction facilities. For example, one advanced digital telecine, the Rank Cintel URSA telecine, has a built-in digital implementation of a 6-vector RCA-type processor, in place of the analog processor 28 shown in FIGS. 1–3. It would be desirable to provide an ESCC which is capable of processing the digital output from the internal digital color processor 28 in the URSA (or the like), having greater capacity and flexibility than that RCA-type color corrector.

A further trend is to increase the bandwidth of the store 32, which will make it practical for the digital color processor to perform its functions on the digital output of the store, making it unnecessary to connect the ESCC to any internal circuits of the telecine.

In either case, an ESCC is needed which will not noticeably reduce the bandwidth of the digital color signal or degrade the picture.

The disclosures of all prior art publications mentioned herein are expressly incorporated by reference.

SUMMARY OF THE INVENTION

The present invention is able to provide remedies for the above, and other, disadvantages of the prior art.

According to one important feature of the invention, only pixels that are specifically selected to be modified are processed by the digital circuitry. The pixels that are not to be modified are passed through the DCP without any processing that could create rounding or other errors.

In contrast, in a conventional architecture, all of the pixels in the picture would be processed through the same signal modification path, possibly being converted from red, green and blue (RGB) to hue, saturation and luminance (HSL), and then back again to RGB, causing errors.

Pixel selection advantageously is carried out by using the architecture referred to below as the "pixel identification table" or alternatively as the "cache tag RAM". The pixel identification table stores digital bits which define which pixels will be selected from the pixel stream for modification. Pixels may be selected as a function of their color (hue) as in prior systems, and/or as a function of other criteria, such as saturation, luminance, (X,Y) pixel coordinates, sharpness, and texture.

Further, after a pixel or region to be changed has been isolated, other parameters besides (H,S,L) color attributes can be changed. For example, the sharpness or even the (X,Y) coordinates of a region can be changed. Modifying the (x,y) coordinates of a region would be useful, for example, for special effects such as moving an object in the picture. Detecting pixels according to their (X,Y) coordinates could also be useful for copying pixels at a given x,y from one frame to another for scratch concealment. The latter process might be carried out simply by, for the given X,Y, controlling the frame store of the DCP (discussed below), so that those specific pixels are not overwritten from frame to frame.

According to another important feature, a very minute modification will be disregarded and not applied to the input signal, since such a minute modification may be an inadvertent mathematical error.

The present invention avoids the problem of discontinuities as well. The known digital color correctors process one picture element (pixel) at a time, and have no knowledge of picture elements adjacent to the element being processed. For example, brightening an actor's lips by simply intensifying the reds will result in bright shimmering spots on the lips, since in practice not all of the pixels in the original lips are of equal saturation and luminance, nor are they all red. The DCP preferably has a first convolver which has knowledge of preceding and following pixels on that line, and also neighboring picture elements on preceding and following lines. By convolving the adjacent pixels in the actual picture, including unmodified pixels, the first convolver can provide gradual transitions. Advantageously, a second convolver receives just the R, G, and B modification values of the pixels that are to be modified. Both convolvers preferably perform a mathematical 3×3, 5×5, or similar convolution on the array of picture elements.

The convolvers afford a more gradual change from "unmodified" to "modified" signals, thus removing any discontinuity. The disclosed scheme smooths out both the modification increments between adjacent modified pixels, and transitions between the resulting pixels as displayed, including transitions between modified and unmodified pixels.

Thus, there are two levels of convolution in the DCP. The first convolver modifies the boundaries between selected and not-selected regions. The second convolver selectively modifies parts of the picture, in response to any or all of the selection criteria that the DCP can detect and respond to.

For example, if an original picture contains a region where the color gradually transitions from red to green, and if it is desired to alter the reds but not the greens, there will be transition problems on two levels. The first level will be referred to as the "macro" level. After a substantial adjustment of the reds, a line will be clearly visible between the reds and the (unmodified) greens, rather than a gradual transition. The first convolver addresses this problem by processing both modified and unmodified pixels to smooth out the macro transition effect. There will also be a discontinuity on a "micro" level. Film is made up of grains, or more precisely dye clouds, which have fixed colors. The apparent change of color in the original picture corresponds to a decreasing density of red grains during the transition into the green region. However, with a high-definition color corrector, it is possible to pick out individual film grains and change them. This type of modification is not usually desirable. It will cause a visible lack of smoothness in the transition from the red region into the green region, because in that transition area the DCP will select and modify half the grains, but not the other half. The second convolver addresses that "micro" problem. It smooths out the color by converting a collection of red and green grains into an even mixed color, to prevent the poor appearance which results from changing only some of the pixels in the transition region.

According to a further aspect of the invention, which is useful particularly for a high definition version of the DCP, the DCP has a high definition, wide bandwidth, main signal path, but a standard bandwidth (or at least lower than HD) signal modification path. This involves a downsampling before the signal modification path, and an upsampling after the signal modification path. This novel architecture achieves the principle of not downsampling or changing in any way the unmodified content of the HD picture, and only imposes bandwidth limitations in the parts that have been modified. Such bandwidth limitations have been found to make little or no difference in the perceived quality of the picture. For example, if the changes in the picture are mainly a chrominance modification, rather than a luminance change, then this will produce results very nearly as good as doing the modification signal path in full HD bandwidth, as it is known that observers are less sensitive to high frequency color changes than high frequency luminance changes. The foregoing method could be described as "real-time pseudo-HD."

In view of its great digital processing power, the DCP is also capable of "non-real-time real-HD". Without subsampling, the system can perform full high definition secondary color correction, but slower than the normal HD video rate. Also, film-type resolutions, up to for example 8000 by 8000 pixels, can be corrected in non-real-time. With the disclosed hardware, a film correction would take approximately 256 times longer per frame (nominal 512×512 image). This would be about eight seconds per frame, instead of 30 frames per second. For film production, however, this delay would not matter, in view of the DCP's advantages related to ease of operation, flexibility, etc.

Another advantageous feature of the invention is its capacity to provide a "wash mode." As an example, it might be desirable to select a light grey sky (i.e. of indeterminate hue) to be made blue. It might be impossible to hue-identify the region with conventional equipment, as a grey region would contain either no hue, or a wide variety of low-saturation red, green, and blue film "grains". Increasing the saturation of such a region would make the sky resemble a sea of multi-colored golf balls. However, with the DCP a light grey sky might be picked up not by its hue, but by looking for high luminance. Having located this area, it would be possible to entirely discard the original hue of the sky, and paint in a new hue, of constant blue. This would not look artificial, as picture detail in the sky would still be provided by the luminance and saturation components.

The system is also capable of other wash modes, such as saturation wash. A saturation wash might be desirable if it were desired to take a normal picture containing a normal range of hues and modify it to contain only sepia hues. It is useful to explain this example in order to illustrate the operation of the DCP.

In red, green and blue color space, higher values mean more color. That is, full R+G+B equals white, zero R+G+B equals black, and equal amounts of R+G+B represents various shades of neutral. When dealing with H, S and L, however, we are in a cylindrical polar color space. The axis of the cylinder defines the neutrals. The bottom of the axis represents black and the top of the axis represents white. All points on the axis have a luminance value, zero saturation, and an undefined hue. Saturation corresponds to the radial distance from the axis. The hue H represents the angle travelled around the axis, before travelling a distance S out from the axis to define a saturation. The angle of rotation around the axis is meaningless if the color in question is still at the axis; therefore, the neutrals (black, grey, white) along the axis have an undefined hue.

The normal starting picture has a full range of colors, including neutrals. It would be impossible to use the "hue wash" process to add sepia hue (a middle-brown hue) to a neutral pixel, because even if sepia hue were added, the saturation would still be zero (recall that all neutral colors have zero saturation), so the pixel would still appear neutral, i.e., grey.

To solve this problem, rather than first modifying hue, the DCP first modifies all the saturation values in the picture and replaces them with a constant non-zero saturation value, i.e., a saturation wash. After this step, all the pixels will now be colored and none will be grey any longer. All the pixels will now have a hue. The second step is a hue wash, in which the hue value of every pixel is replaced with a fixed sepia hue.

Although this process discards two of the three parameters for each pixel, hue and saturation, most of the picture information is still present, because the luminance parameter is unmodified.

A luminance wash can also be performed in an analogous way, and might be useful for special effects.

In summary, the disclosed architecture has, among others, the following important features:

1. An architecture where only the pixels and/or regions to be modified have any processing applied to them.

2. An advantageous way of identifying pixels and/or regions to be modified and not to be modified.

3. A multi-channel approach with precedence logic to meet any possible user requirements.

4. Standard- or reduced-definition modification of portions within a high-definition picture.

5. Image modification circuitry wherein minute modifications are automatically disregarded, thereby preventing any small mathematical errors from inadvertently affecting the image.

6. Wash mode capability for permitting new forms of artistic creativity.

Other features and advantages of the present invention will become apparent from the following description of the invention which refers to the accompanying drawings.

BRIEF DESCRIPTION OF THE DRAWINGS

FIG. 6 schematically shows the arrangement of a cache tag RAM for hue in the pixel identification table of FIG. 5.

FIG. 7 schematically shows the arrangement of cache tag RAMs for X and Y coordinates in the pixel identification table in FIG. 5.

FIG. 9 is a schematic illustration of a cache tag RAM for hue values, showing a RAM divided into eight channels, each channel being arranged for storing data bits corresponding to a respective set or range of hue values.

DETAILED DESCRIPTION OF AN EMBODIMENT OF THE INVENTION

I. Introduction

The DCP disclosed herein is an advanced, multi-functional all-digital color corrector. The inputs and outputs of the DCP are preferably 10-bit digital RGB signals, that is, with ten bits used to describe each of the input red, green, and blue signals.

All components are standard. All functions and timing of the disclosed components are controlled by a Motorola 56000 (or 58000) series microprocessor using conventional techniques.

High definition television requires five times the data rate and bandwidth of standard definition television. The data rate of the DCP will match the HDTV1 output from the BTS FLH1000 telecine. By way of two 50-pin D-connectors, the DCP can accept multiplexed Y/Cb/Cr data in the 4:4:4 format. The word size is 10-bits. The DCP will accommodate a maximum clock rate of 80 MHZ. The following line standards will be supported:

| Lines | EZ | Pixels/Line | Clock (MHz) |
|-------|-------|-------------|-------------|
| 1250 | 50 | 1920 | 72 |
| 1050 | 59.94 | 1920 | 72 |
| 1125 | 60 | 1920 | 74.25 |
| 525 | 59.94 | 720 | 13.5 |
| 625 | 50 | 720 | 13.5 |

Internal calculations will be carried out at 16-bit accuracy, which will prevent rounding errors; the results will be rounded to 10-bits at the final stage of the signal modification path.

Hue can be modified throughout a full 360° range in the cylindrical color space. Saturation and luminance can be varied from 0 to 400%. Hue, saturation and luminance can be selected with 10-bit accuracy.

Preferably, according to a preferred embodiment of the invention, digital video information, for example from the FLH1000 telecine, is decoded and demultiplexed by means of a decoder/demultiplexer such as a standard gate array logic, or an ASIC (element 1 in FIG. 4), or any other conventional circuit which is able to provide a 10-bit Y/Cr/Cb (YUV) data input at up to 74.25 MHz clock rate. This signal is converted by a digital multiplication matrix 2 to provide RGB data. By changing the coefficients within the matrix, master saturation and luminance controls are provided.

Figure 13:
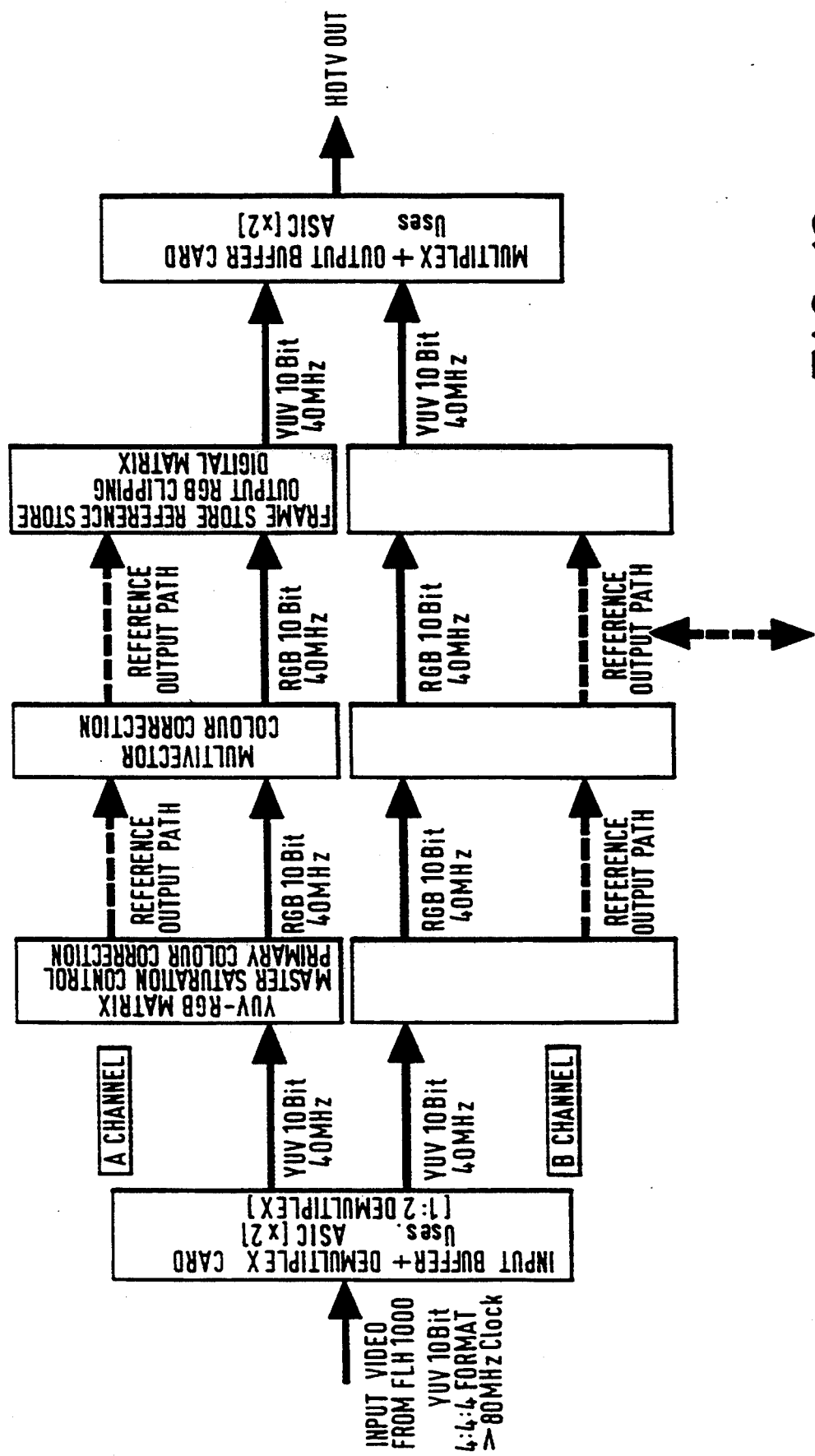
FIG. 13 is a schematic illustration of signal flow among various components of the DCP according to a practical embodiment thereof.
Figure 14:
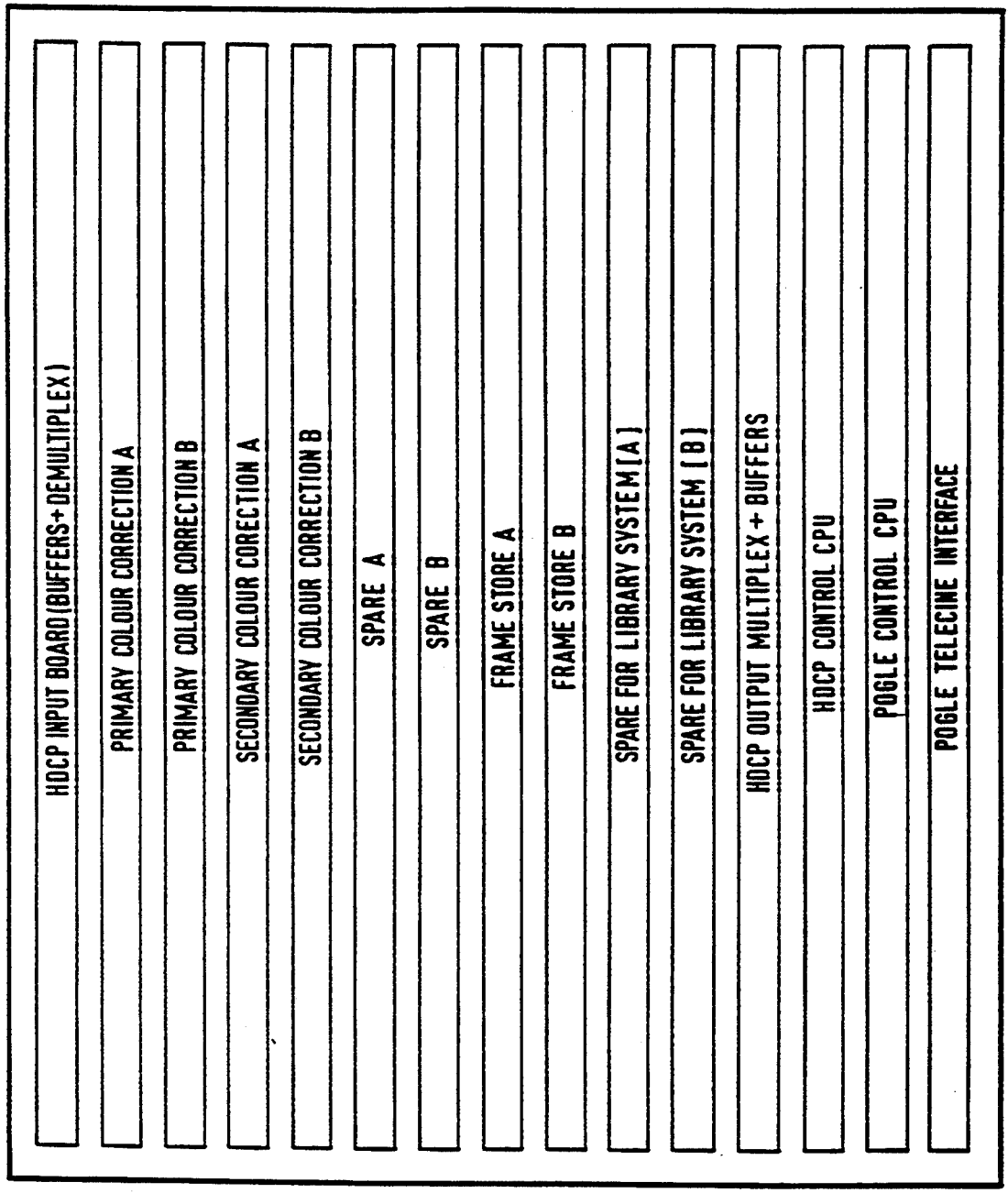
FIG. 14 shows a card rack arrangement in a practical embodiment of the DCP.

Please refer to FIGS. 13 and 14. Even with the speed of recently available semiconductor devices it is not cost-effective to build signal processing circuitry to cope with up to 80 MHz data rates. However, the architecture described herein can easily be broken down into a series of blocks which can operate in parallel to achieve the desired bandwidth.

The device 1 will accept full bandwidth data through the input and output ports of the system. This device, together with ECL buffers, can directly accept signals at clock speeds up to 100 MHz and provide parallel (multiplexed) TTL data streams at reduced frequency.

The device 1 outputs 2 multiplexed channels, each at half the input clock rate. In the worst case (1125-line, 50 Hz) each channel will operate at 37.125 MHz. Each of the A and B channels will be 30-bit-wide parallel data. If pixels are numbered horizontally across each TV line starting at 00, then channel A will carry evenly numbered pixels while channel B will carry the odd-numbered pixels. Differential ECL drivers will be used to carry this data through the backplane to alternate pairs of identical cards. On each card a further level of multiplexing will provide two sub-channels at ¼ of the input clock rate (i.e., 18.6 MHz maximum) which can then be processed efficiently by the various DCP logic blocks. Each card will therefore carry two identical sets of circuitry together with the necessary MUX/DEMUX logic.

As mentioned above differential ECL drivers and receivers will be used to carry video data through the background. This method has already been proved reliable in commercially released Pandora color correctors, which carry multichannel video data multiplexed at similar speeds. ECL will also be used onboard each card to perform the sub-MUX/DEMUX function.

The main microprocessor control channel which runs through the backplane of the system will use BTL drive logic similar to those devices specified for Futurebus. This is desirable in order to achieve the required speed and fanout. Active bus termination will be employed at each end of the Backplane.

Standard television has 500–600 lines (625 in Europe, 525 in the United States) per frame. High definition television has more than 1,000 lines. Film-grade resolutions are equivalent to many thousands of lines (2,000–8,000 for example). With appropriate downsampling and interpolating as described below, the DCP is capable of operating in the following modes:

(a) standard definition main path, standard definition modification path (i.e., no subsampling or interpolating) in real time;

(b) high definition main path, standard definition modification path (i.e., with subsampling at 3a and interpolating at 5a) in real time;

(c) the use of the system as in (a), without subsampling or interpolation, for non-real time processing of high definition or film resolution video; and (d) high definition main path, high definition modification path, in real time, without subsampling or interpolating.

In all of these cases, the pixel depth, i.e., bits per pixel, is 10 bits (1,024 levels).

"Resolution" refers herein to the spatial resolution between lines, or pixels within a line; while "pixel depth" refers to the number of bits per pixel.

Figure 4A:
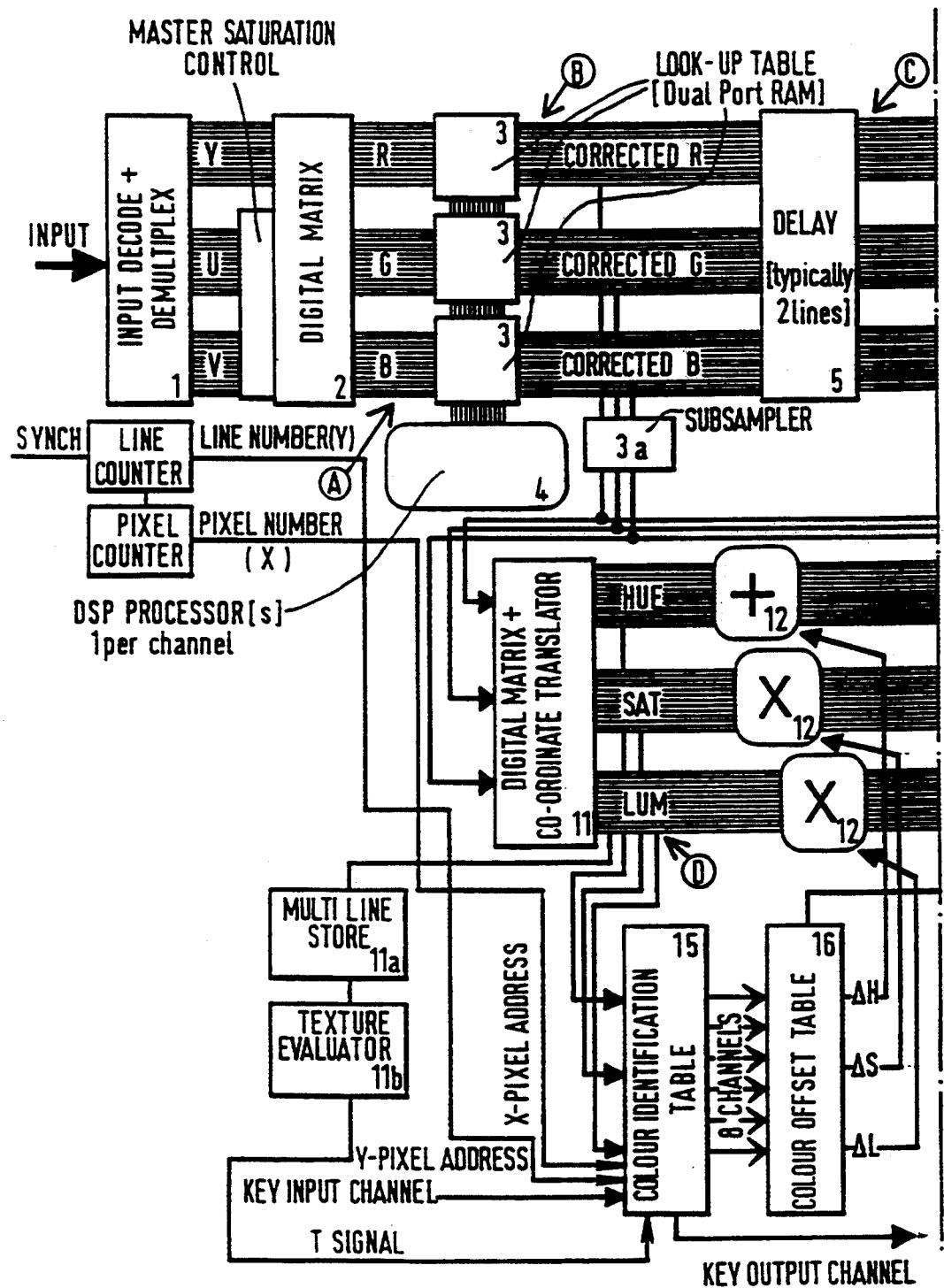
FIG. 4 is a block diagram showing a digital color processor (DCP) according to a preferred embodiment of the invention.
Figure 4B:
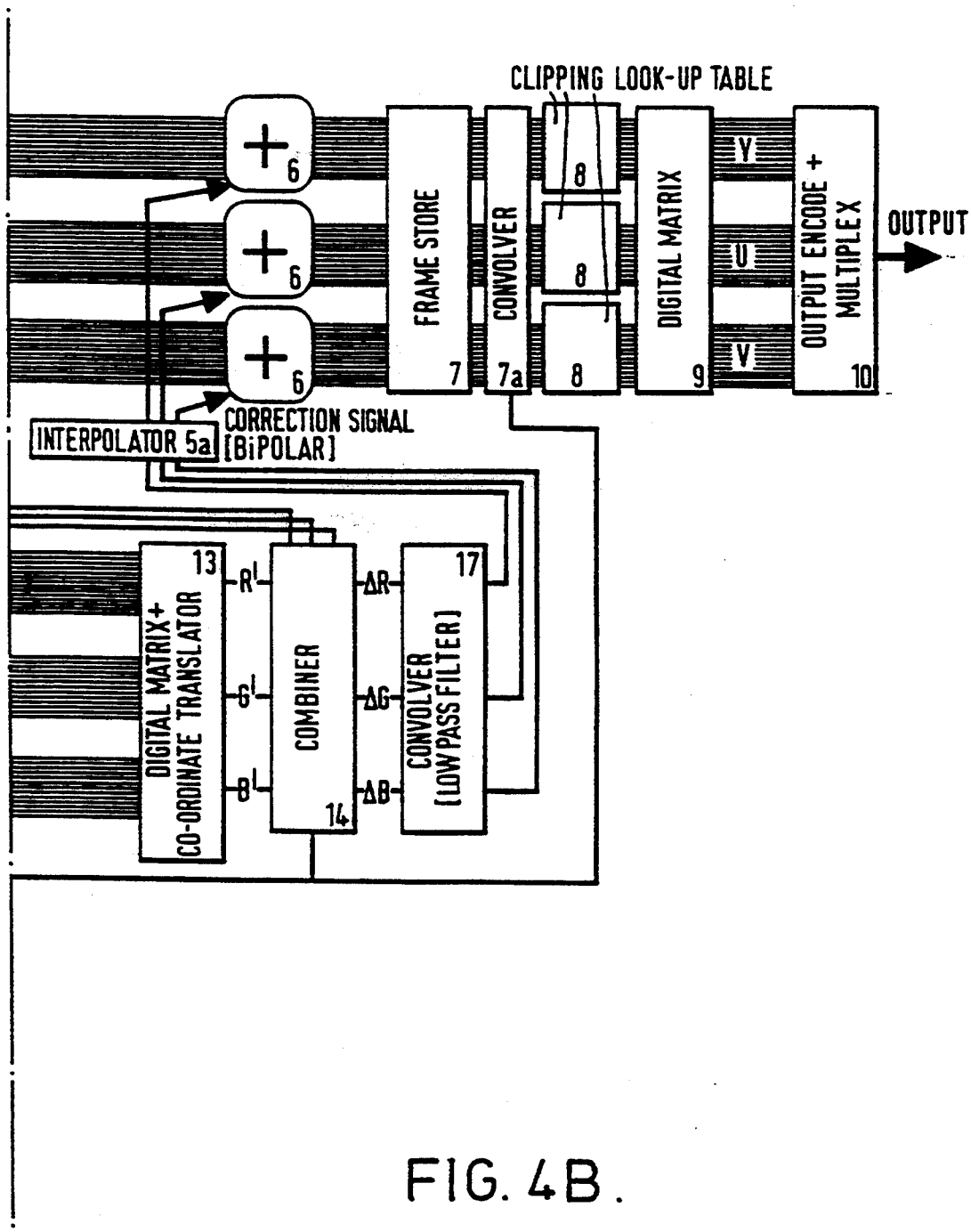

A block diagram of the DCP is shown in FIG. 4. A primary signal processing path transmits the input signals to the outputs. A secondary path forms a bypass off of the primary path, and is used to calculate the modification signals.

II. Primary Signal Path

The primary signal path starts with the inputting of RGB digital signals at an input, which may be respective 10-bit RGB output signals from a telecine, a VTR, or any other digital video signal.

The R,G,B digital signals may be supplied by a conventional input arrangement as shown in FIG. 4, which comprises an input decode and demultiplex unit 1, which receives RGB signals and outputs Y, U and V signals; an intermediate master saturation control which processes the U and V signals from the unit 1; and a digital matrix 2, the latter outputting the 10-bit R, G and B signals.

For pixels that are not intended to be modified, a completely transparent R,G,B signal path is provided from point B (or point A if the LUT's 3 are not set to modify the video signal) through the output of the convolver 7a (and further, through the LUT's 8 for legal video signals). For use with the RGB output from the Rank Cintel 4:4:4 URSA store, conversion between RGB and YUV is completely unnecessary. In any event, the conversion between YUV and RGB and vice versa at stages 1, 2, 9 and 10 in FIG. 4 is essentially reversible and does not introduce errors in the normal case.

The R, G and B signals are then provided to respective primary lookup tables 3 (LUT's). These can be used, if desired, to perform the same functions as the conventional gain (white level), lift (black level), and gamma (contrast and midtone) controls of the telecine. They can also modify color. The primary lookup tables can modify all of the pixels in the entire picture. They can be used to perform "master" modifications (that is, modifications applied equally to the red, green, and blue channels resulting in a tonal change, but not a color change), by applying an identical modification to the red, green, and blue lookup tables. "Differential" modifications are accomplished by applying modifications to only one or two of the lookup tables. In this way it is possible to modify, for example, the gamma of blue only.

The primary LUT's 3 are preferably dual-ported RAM's, so that they can be loaded via one port, while the main signal processing function continues via the other port. Thus the LUT's 3 are capable of being reloaded between frames, which is known to those in this art as "dithering." Applying different LUT's to successive frames is useful for temporally breaking up grain and noise, for example.

One reason for replicating the functionality of the telecine controls with the primary lookup tables 3 is to be able to custom-load these tables and thereby accomplish a degree of control not available on the conventional telecine.

The primary lookup tables 3 are not essential to this invention, but are primarily a convenience for use in tape-to-tape transfers. They also may be used to control the response curves of the DCP in order to, for example, emulate a particular telecine. They are loaded by the DSP 4, which is controlled by a programmer/controller such as the POGLE controller described above.

The DSP (digital signal processor) 4 is a microprocessor of any conventional design which is capable of implementing an algorithm for producing a family of curves, dependent on the parameters of the algorithm. For example, a family of different parabolic curves can be generated by calculating in the DSP 4 the value of the output of the algorithm on a step-by-step basis for each step of the lookup table. For example, if the DSP is programmed with the equation of a straight line, a straight line is loaded into the lookup tables 3.

The lookup tables 3 are constructed by using RAM memory which is addressed by the input video signal. When the system is first powered up, the processor 4 associated with each lookup table writes an incrementing series of values at each address in the RAM. In other words, initially, the contents at a given address equals that address. Thus, when the video signal is applied to the address input of the RAM, the data output provides exactly the same hexadecimal value and so the video signal passing through the RAM remains unchanged.

However, at any time, the DSP 4 may calculate a different series of values to be written into the RAM for providing a translation of the video signal. By this means it is possible to transform any red value in an input signal, for example, into any other red output value.

At point B, after processing by the primary lookup tables 3, all of the corrected R, G and B signals, including those that are not to be modified, are provided (possibly downsampled) to the secondary signal path.

If the primary signal path is high definition (HD) then it is advantageous, as discussed above, for the modification path to be standard definition. Therefore, the HD image is subsampled down at point B and is interpolated up at point C. A subsampler 3a and an interpolator 5a are shown in FIG. 4. According to one simple subsampling technique, it is possible to simply pick every other pixel and every other line in the subsampling process, and then to replicate each pixel and each line in the interpolating process. Also useable are more complex techniques such as bilinear sampling and interpolation (that is, linear interpolation in both the along-line and between-line directions); and even more complicated interpolators such as the Cubic-B spline technique. See, for example, W. K. Pratt, Digital Image Processing (Wiley 1978), at pages 113-116, incorporated by reference.

According to one example of a technique of bilinear sampling and interpolation, the subsampler 3a could interpolate down, for example, by averaging 2×2 arrays of pixels in a high definition 1,000-line picture and converting those four pixels to one standard-definition pixel, that is, a four-fold data reduction. The resulting data rate will be ¼ of the high definition rate, that is, approximately the standard definition rate. Correspondingly, after processing by the signal modification path, the interpolator 5a would interpolate up by, for example, bilinear interpolation between adjacent ones (in both the X and Y directions) of the standard-definition pixels that have been processed in the signal modification path.

Next along the primary signal path is a digital delay 5, which may comprise one or more delay lines. In the disclosed embodiment, the delay 5 provides a time delay of two lines (2L). This delay gives enough time for the secondary signal path to calculate the modification signals, which will be used to modify the original signals.

After the delay 5, the modification signals are brought back into the main signal path at point C, and combined, for example by interpolation (upsampling) by an interpolator 5a, with the unmodified main signals by correction adders 6. The output signals from the adders 6 then form the 10-bit red, green, and blue modified digital outputs which are then filtered by the convolver 7a and subsequently outputted from the DCP.

Element 7 is a buffer frame store, which provides resynchronization of the video signal after processing. Video delay through the system is thereby arranged to be one TV frame. H and V output timing adjustments (not shown) are also provided.

The logic used to provide both primary and secondary color correction is pipelined for reasons of speed. This means that the signal at the output of the adders 6 is delayed in time relative to the input. In a studio environment this time delay would have disastrous consequences and so the frame store 7 is used to resyncronise the video output.

This frame store 7 is constructed using RAM configured as a FIFO memory, whereby data is written in using the input clock which has been passed through the pipelined stages discussed above. Some time later a regenerated clock locked to station reference is used to read out the data in a similar order, but in synchronisation with system line and field timing.

A second frame store (not shown) is provided in parallel with the above to allow the operator to store a single frame of video for color matching. The input to this second frame store is switchable from various stages throughout the processing circuitry, allowing the colorist to compare between a corrected and uncorrected image. The output of the second frame store may be overlaid on the main video output by means of a WIPE control.

Convolver 7a receives the output of the frame store 7 and smooths it according to a known convolution scheme which is discussed below in connection with the convolver 17.

The convolver 7a output is passed to a lookup table 8 which is used to perform a clipping function on the RGB signal in order to ensure that improper or illegal values are not passed to the output. The lookup table may be updated at any time by a microprocessor (not shown), allowing different algorithms for clipping to be selected.

For example, the clipping lookup table 8 clips signals at their maximum or minimum values to prevent "roll-around", i.e. to keep the output within the 0-255 (8-bit) range. In addition, it is normally necessary to restrict the output to the 12-240 range, as required by the SMPTE standard for digital video, the reserved areas above and below this range being used for blanking and special effects. The LUT's 8 may be reconfigured under software control (not shown) to select either "hard-" or "soft-edged" clipping algorithms.

Finally the RGB signal is re-converted to YUV color space before being passed to the output multiplexer and the line driver stage. Use may be made once more of the above-discussed decoder/demultiplexer (in reverse) or an equivalent device to reconstruct the output signal in a similar format to that originally derived from the FLH1000 or other telecine.

Element 9 is a matrix which converts, if necessary, from the RGB environment to a YUV (luminance-chrominance) environment. Finally, in the output encoder and multiplexer 10 the YUV signals are conventionally encoded and multiplexed for, e.g., broadcasting or recording.

III. Secondary (Modification) Signal Path

In the secondary signal path, the DCP produces respective modification signals for those pixels, and only for those pixels, which have the criteria indicating that they are to be modified.

A. Signal Conversion to (H,S,L)

The first step in the modification signal path is a digital matrix and coordinate translator unit 11 which converts the red, green, and blue signals into signals representing hue, saturation, and luminance. There are several commercial chips which can perform this function by use of public-domain algorithms. In this case, the matrix first provides conversion from (R,G,B) to (Y,U,V). The Y signal becomes the final L signal. The coordinate translator converts from Cartesian coordinates (U,V) to cylindrical polar coordinates (H,S), by means of a lookup table in PROM.

Transformation from R,G,B signals into cylindrical color space (H,S,L) is described, for example, in R. W. G. Hunt, *The Reproduction of Color in Photography, Printing, and Television* (Fountain Press, Tolworth, England, 4th ed. 1987), ISBN 0-85242-356-X, at 114–121, incorporated by reference. In cylindrical color space, luminance is conventionally shown as a vertical axis. Planes which intersect this axis at right angles are planes of constant luminance. Planes of constant hue extend radially out from the axis, each having a hue angle. Saturation or amount of color is represented by the distance from the axis; thus, at the luminance axis there is no color.

One possible hardware implementation, incorporated by reference herein, utilizes first the TRW model TMC2272 chip, which transforms the incoming RGB to YUV, which is a color space comprising luminance (Y) and two mutually orthogonal chrominance vectors U and V. The second stage is the TRW model TMC2330 chip, which mathematically transforms from rectangular (Y,U,V) to polar coordinates (H,S,L). Both of these chips are also usable in the reverse direction for conversion from HSL to YUV to RGB.

H,S,L color space is conceptually convenient to use in practice. In contrast, the U and V vectors are difficult to imagine. The conversion from YUV to RGB to HSL is in two stages for convenience, as standard chips are readily available to do these two conversions, while no standard chip is readily available for converting directly from YUV to HSL. On the other hand, three-dimensional RGB color space is essentially cubical and therefore, it is advantageous to carry out the clipping functions by the LUT's 8 (and also the master transformations by the LUT's 3) in RGB space.

B. Pixel identification Table

Following the conversion to H, S, and L, selected boundary conditions in this color space are inputted under operator control into a pixel identification table 15, which distinguishes the region of color space to be modified, from the region not to be modified. This technique will be referred to herein as "cache tagging". It involves defining a range of data bounded by particular data values. These ranges are "tagged" in a "cache tag RAM" (described below) for later use. As shown in FIG. 4, X, Y and T tags may be employed. At least H, S and L "tags" are employed in the preferred embodiment.

For each pixel, it is determined whether to "modify" or "not modify" that pixel by taking the logical AND of the output bits from the H,S,L, etc., cache tag RAMs, which are loaded with the predetermined criteria for selecting which pixels in the input signal are to be modified. If all of the output bits are "1", that will indicate that for that pixel, a modification signal will be generated, which will be added back into the main signal path later on.

As an example of this process, the DCP is capable of tagging only very narrow range of reds, which might be useful, for example, to improve the color of one piece of red clothing. All other "reds", and other colors including black, white and grey, remain untouched. By the same process, all of the colors in a multicolored piece of clothing can be selected simultaneously.

Advantageously, there is also a "master hue" or "wash" mode, wherein all of the pixels in the picture are marked to be changed, and then the hues or other attributes of all the pixels can be changed simultaneously.

Figure 1:
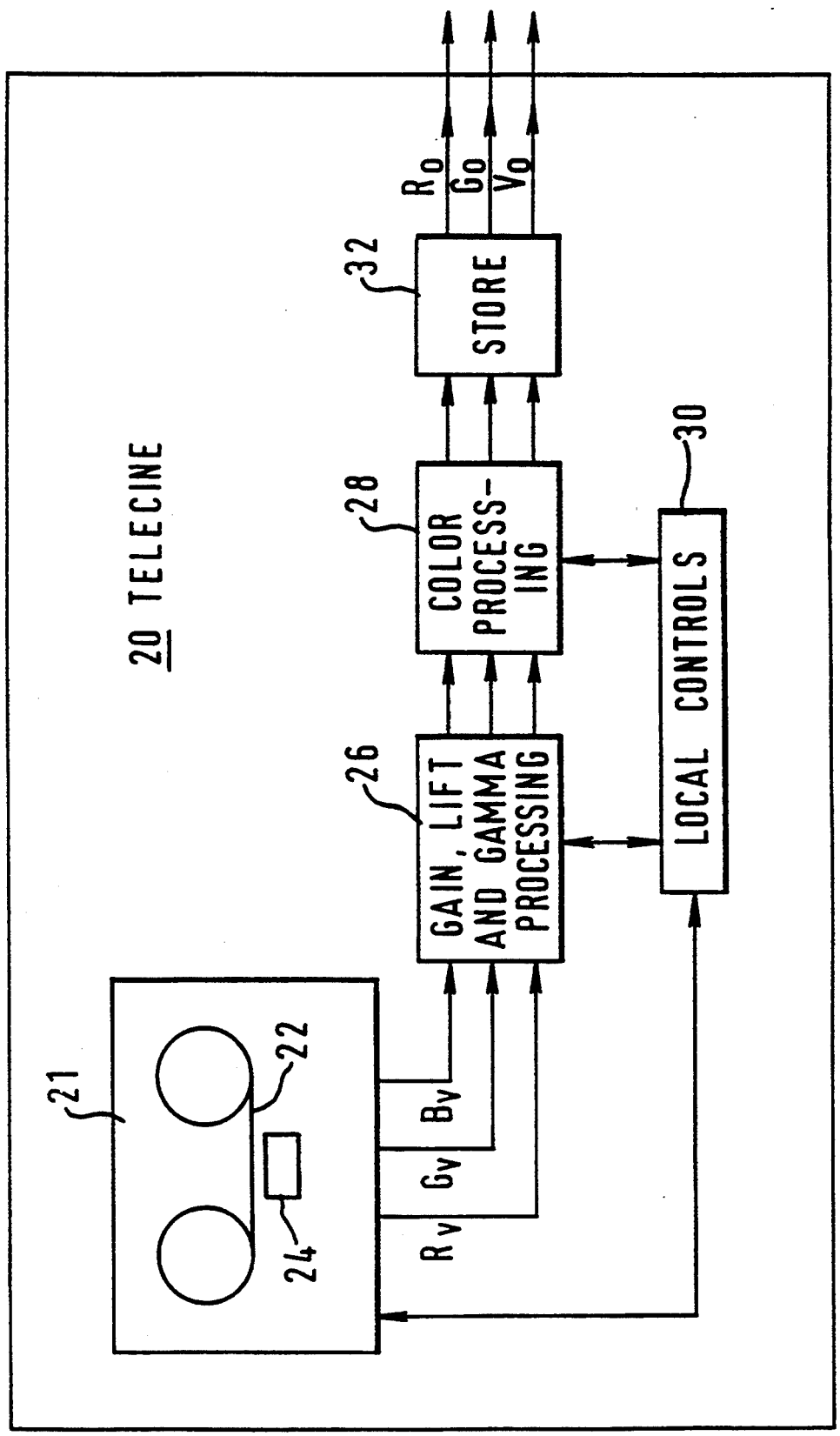
FIG. 1 is a block diagram showing a prior art color correction system.
Figure 2:
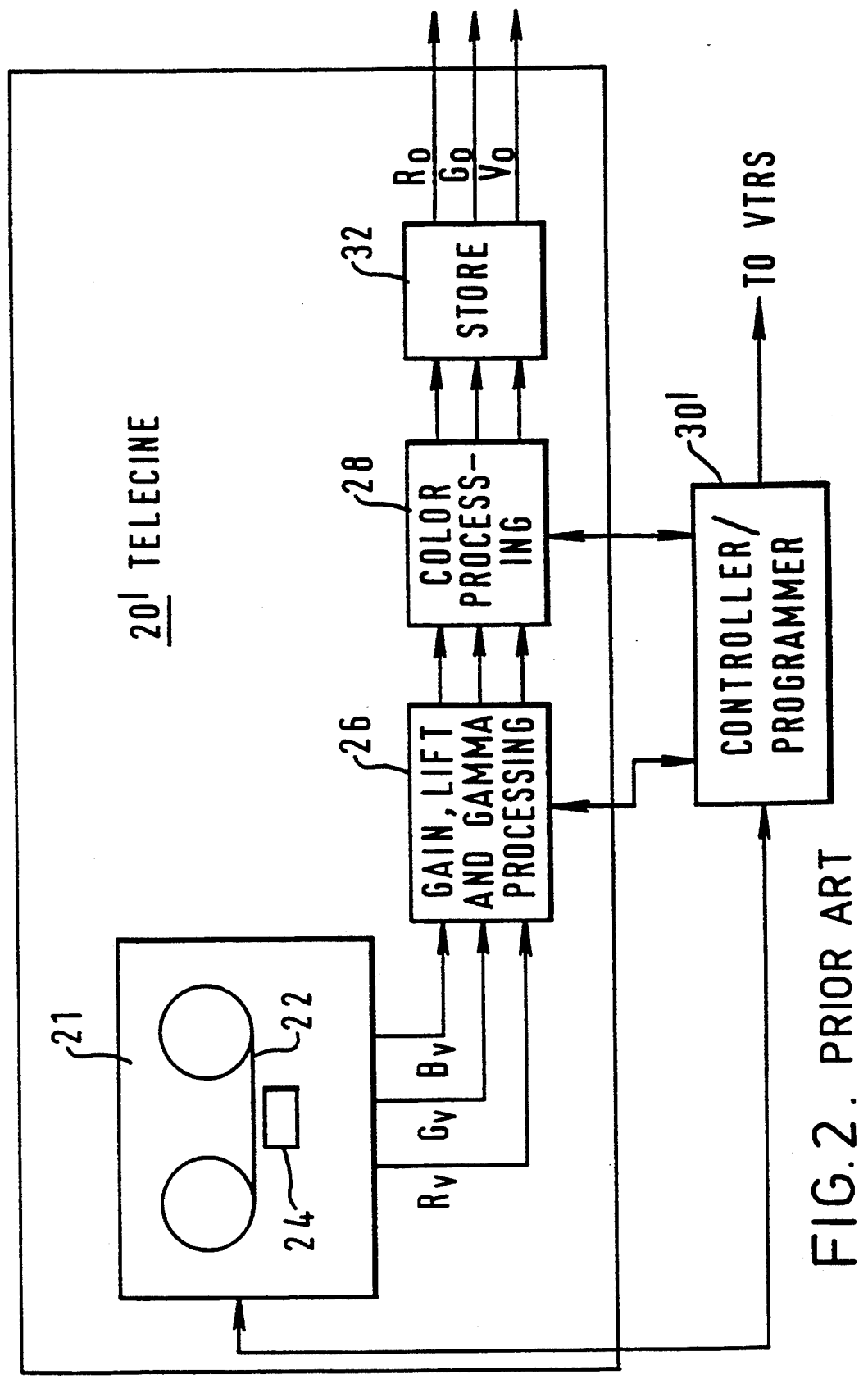
FIG. 2 is a block diagram showing a second prior art color correction system.
Figure 3:
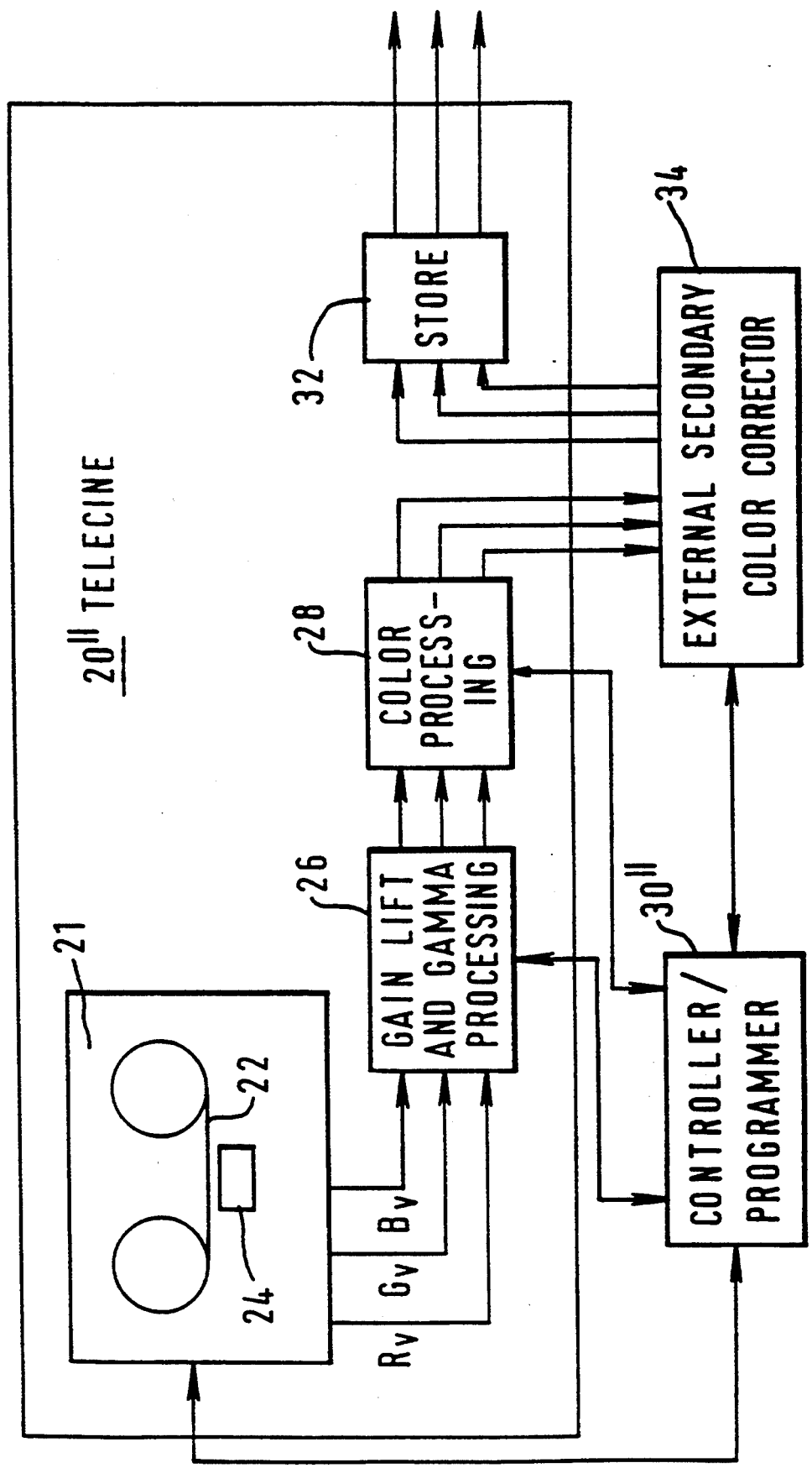
FIG. 3 is a block diagram showing a third prior art color correction system.

"X" and "Y" tags can also be used in the cache tag RAMs, in order to represent the boundaries spatially (where X and Y are pixel and line addresses). X and Y tags can be inputted, as shown in FIG. 1, by direct entry of X and Y addresses into the pixel identification table 15.

X and Y coordinates of a particular pixel are determined from the studio synch signal as seen at the left-hand portion of FIG. 4. Lines are counted by a line counter and pixels within each line are counted by a pixel counter. The line counter and pixel counter have outputs corresponding respectively to the Y and X coordinates of each pixel. The synch signal contains a frame reset signal which corresponds to X=0, Y=0 followed by a series of pulses for incrementing X, followed by a line reset signal (which resets X to 0 and increments the line number Y). The X and Y signals are made available to the pixel identification table 15. The availability of the X and Y coordinates of each pixel enables processing of each pixel "on the fly" in a very simple manner.

Alternatively, a conventional key input channel to the pixel identification table 15 is essentially a substitute for the cache tag RAM. (It could also be used in tandem with the X and Y tag RAM.) A conventional key input signal can be applied to the key input channel and ANDed with the H, S and L table outputs to control directly when the offsets from the offset table 16 are to be applied to a given pixel. As is conventional, the DCP and the source of the key input signal are coordinated by the common sync signal to which all of the studio equipment is normally connected. The key signal, again as is conventional, is a black-on-white or white-on-black picture signal (which may be rectangular or have any other shape) which can be used to control further equipment such as the offset table 16. A key input signal can be generated by a vision mixer such as the Abekas A84 and many other devices.

Also as seen in FIG. 4, the pixel identification table 15 can be employed to indicate selected pixels by means of a conventional key output signal on a key output channel, for controlling further equipment, rather than to select offsets from the offset table 15.

Figure 5:
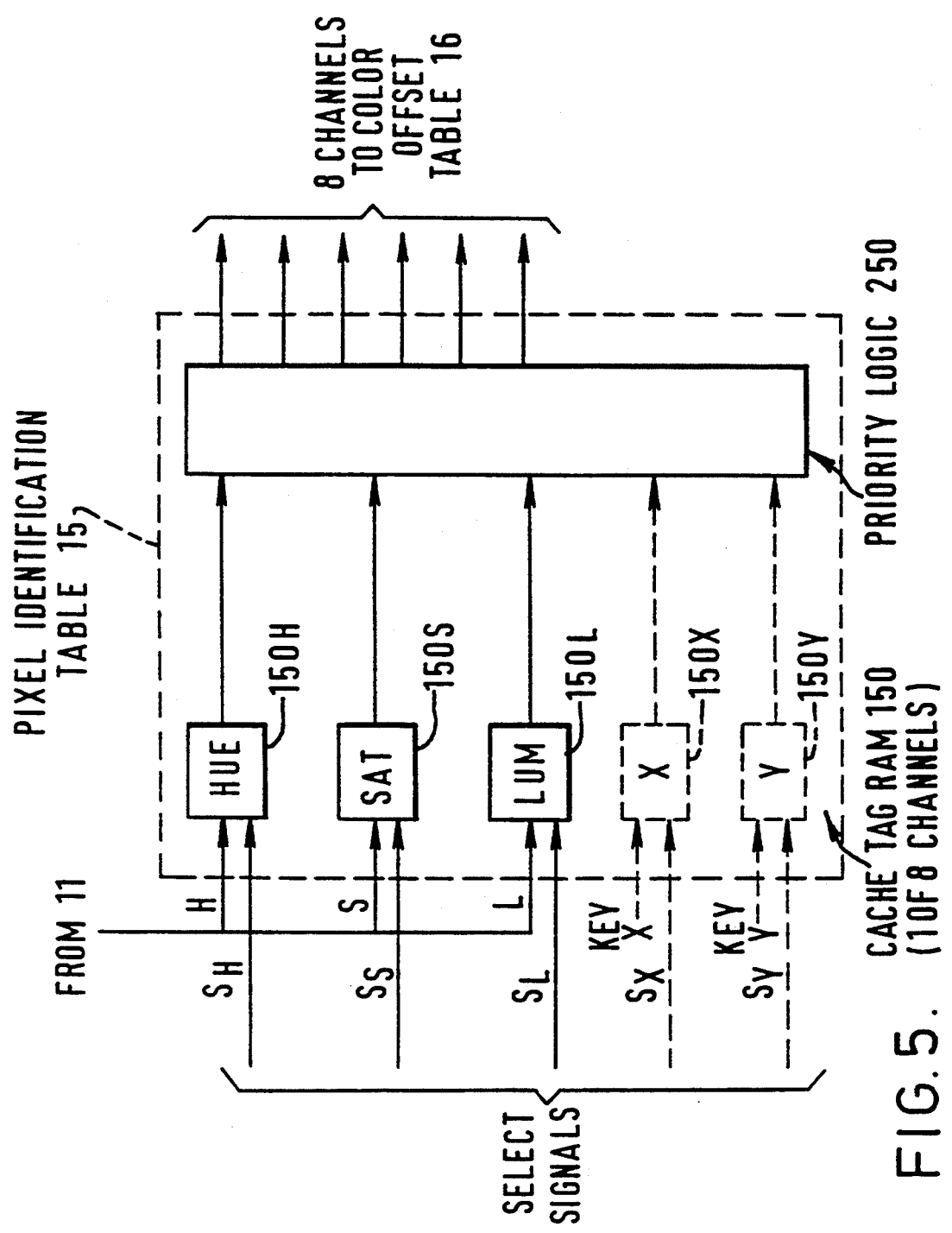
FIG. 5 is a block diagram showing the pixel identification table of the DCP.

FIGS. 5 and 6 show the structure of the pixel identification table 15 in more detail. It comprises a cache tag RAM (or CTR) 150, which in this embodiment comprises at least hue, saturation, and luminance RAMs 150H, 150S and 150L, respectively. These may be supplemented by X and Y RAMs 150X, 150Y. Hue, saturation, and luminance components of each pixel are supplied by the digital matrix and coordinate translator 11 at point D as described above. Select signals SH, SS and SL are provided by the control panel or by a controller such as the POGLE controller and provide data to be entered into the RAMs 150H, 150S and 150L respectively, to indicate how pixels are to be selected for modification according to their hue, saturation and luminance (and optionally SX and SY signals, and/or other signals representing sharpness, texture, or another parameter). The entered selection criteria distinguish the regions to be modified from the regions not to be modified, and to generate control signals according to predetermined standards to control the DCP. The RAMs 150H, etc., will be described further below in more detail.

By means of a cursor, the operator of the DCP can point on a screen to a particular color, or to a physical region containing one or many colors. The programmer/controller will then provide (H,S,L) data and optionally (X,Y) or other data to the pixel identification table.

There are a plurality of channels (for example, 8 channels) each having a set of cache tag RAMs 150 which can thereby specify 8 modification sets. For example, 8 objects in a picture can be modified if they can be specified uniquely by a combination of H, S and L data, optionally supplemented by X and Y data, for example. The RAMs 150H, 150S and 150L are each 1K RAMs, i.e., RAMs having 1,024 address locations corresponding to a 10-bit input address. The CTR's can be implemented by standard components or by an application-specific integrated circuit (ASIC). By means of such RAMs, 1,024 individual degrees of hue, saturation and luminance can be defined. Thus, 3K bits can control $2^{30}$ (or 1,073,741,824) possible colors. Great color resolution can be controlled by means of a minimal amount of data.

FIG. 6 is a schematic diagram indicating a possible implementation of the hue CTR 150H. As an example, the bottom third of the addresses in RAM 150H could be designated to correspond to respective shades of red. The middle third could correspond to shades of green, and the top third of the addresses in RAM 150H could be designated to correspond to shades of blue. These designation are indicated by the letters B and R on the left side of FIG. 6. As seen therein, bits 4–13 are loaded with the value "1" and the rest of the bits are loaded with "0." Thus, a narrow range of shades of red that have been defined to correspond to bits 4–13 are being selected for modification. Every pixel is applied as an address to the hue CTR 150H in the pixel identification table 15. If a pixel's hue is binary 4 to 13 the output of the CTR 150 H will be 1, indicating that that pixel has a hue in that range of red shades. Those pixels will be modified according to a predetermined modification stored for that channel in the offset table 16.

If, in the preceding example, a pixel with that specific shade of red is to be selected regardless of its saturation and luminance, then the S and L RAM's 150S and 150L are loaded completely with 1's.

The H, S, and L table contents for a particular pixel are ANDed to determine whether that pixel will be selected for modification. For example, all pixels of a given hue, irrespective of the S and L, can be selected by loading selected locations in the H table with ones, and all of the S locations and all of the L locations with ones. Or, only certain combinations of H, S and L can be selected by only filling portions of each table, which need not be continuous, with ones. The cache tag RAM signals are ANDed, and therefore, only if all of the criteria (H, S, L, X, Y, and any other criteria being used) are met, will that pixel be tagged for alteration.

Advantageously, there will be a macro feature on the controller to carry out any routine series of loading functions, such as, for example, setting up the DCP to select pixels of given hues, automatically loading all of the S and L locations with ones in order to disregard saturation and luminance.

In practice, it has been found advantageous for there to be default settings for the H, S and L tables. By default, all luminance values are selected by filling all locations in the L table with ones. Channels 1–6 are each loaded with 1/6 of the hue range. The top 95% of the saturation range is loaded with ones, in order to select substantially all colors, but not neutrals (which have zero saturation).

FIG. 7 shows a possible implementation of CTRs 150X and 150Y, which again are 1K RAMs. These two RAMs can be used to designate individual pixels, or rectangular regions that occur at intersections of X and Y ranges. The Y and X locations correspond respectively to lines and locations within lines in the picture. Controlling spatial regions of a picture for modification with 1K RAMs for the X and Y coordinates is not as powerful a technique as using a 2-dimensional address memory, for example, but it is almost as useful and is still very powerful because again, with only 2K bits of data, one million distinct pixel locations can be designated. Thus, by this technique, the DCP can delineate, for example, a rectangular region of the picture to be modified (or not modified).

As an example of cache tagging, let us consider the example where we wish to modify all pixels in the picture with a "mid-range" value of luminance. In this example, the control panel will interpret its settings as an instruction to change pixels which have any value of hue, and any value of saturation, but a luminance value greater than a lower threshold L1, and less than an upper threshold L2. This will cause the luminance tag RAM to be loaded with zeroes for the possible 10-bit values from 0 to L1. For example, if L1 is 256 (one-quarter range) and L2 is 768 (three-quarters range) then the first 256 values of the L cache RAM will be loaded with zeroes ("do not modify"). The addresses 257 to 767 will all be loaded with the value "1" ("modify"). The remainder of the cache tag RAM addresses (addressed 0 to 256 and 768 to 1023) will be loaded with zero ("do not modify").

It can be seen from this simple example that we can distinguish by this technique between any region in color space and any other region. Even if two regions have the same hue, they can be distinguished on the basis of luminance or saturation. For more complex cases, we can distinguish by logical combinations of H, S, and L limits (and/or X and Y addresses). Note that a range of a single parameter or a region of colors need not be contiguous. Thus, if 157 non-consecutive values of hue were to be modified, at those 157 hue-valued addresses in the hue cache tag RAM, there would be a "1". This demonstrates the enormous resolving power of the cache tag system.

As mentioned above, the architecture of the DCP provides for a plurality of independent channels. For example, 6, 8 or 10 channels may be sufficient for most purposes. FIG. 9 schematically shows 8 channels. Thus there can be eight "channels" with respective pixel identification tables 15, which are able to modify eight separately defined regions, colors, luminance ranges, etc. These regions can overlap.

In practice, all 8 channels of hue, for example, can be implemented with one 8K hue RAM. The hue RAM has 8 bits of data at each address, each bit corresponding to one hue address for one of the 8 modification channels.

The hue CTR is structured in bytes as is normal for memories. Each bit of the 8-bit byte corresponds to one channel and represents either "select" or "not select" the particular hue which corresponds to that byte for that particular channel.

FIG. 9 shows the hue CTR in greater detail. FIG. 9 shows an 8K RAM where 8 channels (1H–8H) have been designated having 1K (1024) bits each. This will be presumed to be the H CTR, the S and L CTR's being identical. A given 10-bit H value of an input pixel is inputted to the CTR 150 H and is used as an address for addressing all 8 of the channels. If, for channel 1, the H, S and L CTR's all have 1 at a particular address corresponding to the input pixel's H, S and L value, then that pixel is said to have been "tagged" for alteration. Then, for that channel, the ΔH, ΔS and ΔL which have been preloaded, will be supplied from the offset table 16.

C. Priority Logic

The DCP pixel identification table 15 contains precedence logic 250 to resolve internal conflicts between channels about color modification. Many such conflicts will be avoided by the use of X and Y cache tag RAMs to specify a specific physical object whose color is to be modified, but even then, a conflict will occur when moving objects find themselves temporarily in the same X,Y region. To implement the priority logic, highest priority may be given to lower-numbered channels, and lower priority to higher-numbered channels. This is not a restriction on operational flexibility, as channels can be renumbered at will.

As an example, it might be desired to modify a particular red shade in one way when it occurs in several traffic signals in a given scene, but in another way when it occurs in the clothing of a person walking near the traffic signals. The solution would be to give priority to a channel which specifies both clothing color and location, so that the red shade will be modified appropriately when it is at the proper location within the clothing, and will be modified in the other way when it occurs anywhere else in the scene.

As another example, if it were required to make an image go monochrome, except for the reds in the picture, one channel of the DCP could be used to make all of the picture monochrome. Then, a second channel would be selected to identify reds, to prevent them from going monochrome. The second channel would be designated to have priority over the first channel.

Channel 1 is always the highest priority channel. An input pixel, for example, is applied first to channel 1. However, a given priority hierarchy can easily be modified by swapping the content of each channel with that of any other channel. The channel numbers assigned to each 1K bit array in the CTR are internally controlled and managed within the DCP.

Figure 10:
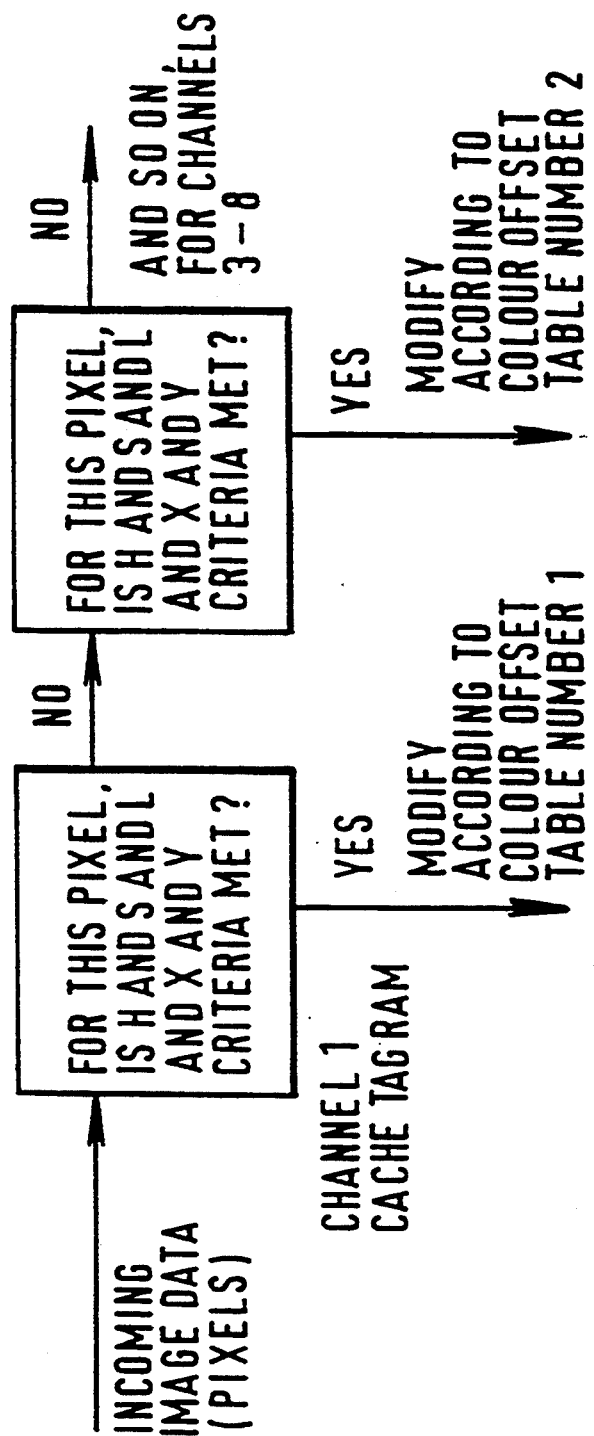
FIG. 10 is a flow chart illustrating the channel priority logic in the pixel identification table of FIG. 5.

The priority logic is shown in more detail in FIG. 10. For example, if channel 1 has been loaded to tag red colors and change them to blue, and channel 6 has been loaded to tag light colors and change them to dark, a pixel with a light red color will be corrected and changed to light blue by channel 1. It will not be corrected by channel 6, because channel 1 has priority. If the operator does not like this result he can reorder the priority by swapping the contents of channels 1 and 6. Channel 1 will become the light color channel and channel 6 will become the red channel. Thus, a light red will now be controlled by channel 1 and changed to dark red.

D. Texture and Sharpness Detection

The DCP can also sense and respond to texture. Texture can be sensed on the basis of an analysis of luminance values according to standard methods as described, for example, in *Pratt* at 503–511, incorporated by reference. Texture is detected by analyzing the luminance data in a series of lines in the pixel by known methods, according to criteria such as spatial frequency and randomness. A spatial correlation function is defined in equation 17.8-1 on page 506 in *Pratt*. No one pixel can define a texture. A group of pixels is needed to define a texture. *Pratt* recommends a window of about 6×6 pixels to define texture, at page 507.

Likewise, sharpness can be detected even more simply. Page 319–325 of *Pratt* displays a method for detecting sharpness. Simply described, looking at a 3×3 window of pixels, if all of the pixels are similar to one another, the area is not very sharp, whereas if there is a large difference between one area of the window and another, then that area is considered sharp.

Figure 11:
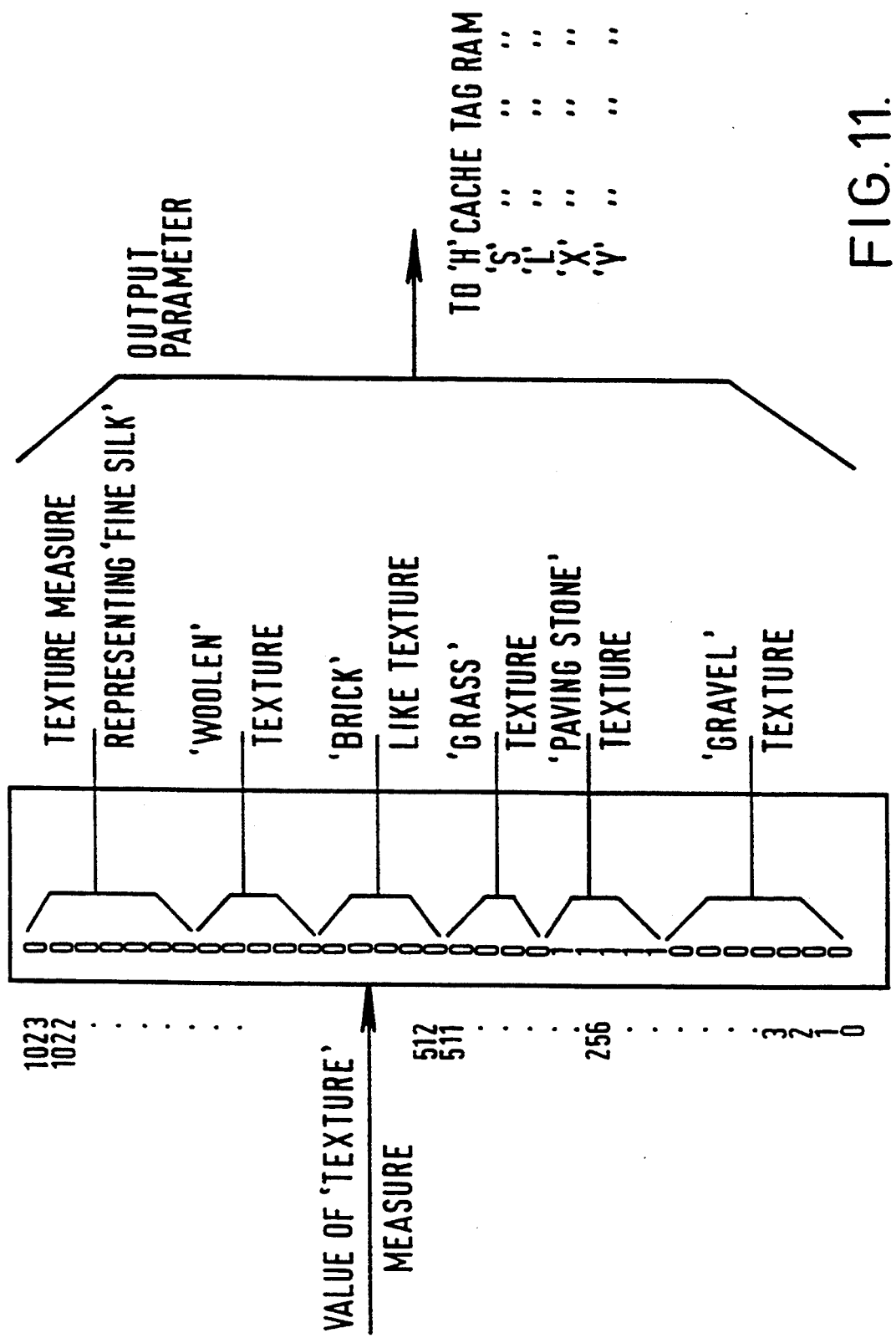
FIG. 11 is a schematic diagram showing the use of a cache tag RAM to store selection criteria corresponding to video textures.

FIG. 11 shows an alternative cache tag RAM which can be set up for responding to texture. Address ranges in the RAM are arbitrarily assigned to correspond to different types of texture.

As seen in FIG. 4, luminance data are loaded into a multi-line store 11a and then the data in the store 11a are analyzed by a texture evaluator 11b. The time delay provided by the delay 5 is adjusted to accommodate the cycle time of the store 11a. Depending on what texture is detected, a predetermined 10-bit word can be outputted as a T signal to the pixel identification table 15. If the output of the texture evaluator 11b is, for example, binary 512, indicating a brick-like texture, then when that word is applied as an address to the texture RAM shown in FIG. 11, a 0 is found to be entered at address 512. Therefore, the particular group of pixels being analyzed for their texture will not be selected for any modifications. On the other hand, if the texture of paving stone is detected, then an output number, for example, binary 256 will be outputted to the pixel identification table 15. As seen in FIG. 11, address 256 has a "1". Therefore, the output from the texture RAM will be 1. This output is "ANDed" with the respective output of the H, S, L, X and Y RAMs, and if the ANDed result is "true" then it is determined that the pixels then being detected for texture have been tagged for modification.

E. User Interface

The user interface of the DCP is designed for "user-friendliness". When initially turned on, it emulates such prior 6-vector secondary color correctors as the RCA Chromacomp, which merely give the operator direct control over the relative proportions of six specific colors, the primaries (red, green and blue) and the secondaries (cyan, magenta and yellow). Operators have come to think in terms of those six colors. The Da Vinci gave greater control, dividing the color circle into 16 hues, but still, the Da Vinci controlled only hue. In contrast, the DCP also controls luminance, saturation and other picture attributes.

To make the DCP more user-friendly, its user interface initially displays six channels configured as a standard six-channel color corrector. In contrast to the standard corrector, however, the locations of the six vectors are not fixed, but rather can be "steered" so that each of the six channels can control any desired color. In the preferred embodiment, two additional channels are provided as well, giving a total of eight channels, although those last two channels are not initially displayed, but instead may be activated manually.

For example, the initially displayed red, magenta and yellow channels could all be "steered" to control three different shades of red. The operator might then wish to use the additional channels 7 and 8 to control magenta and yellow.

Figure 12:
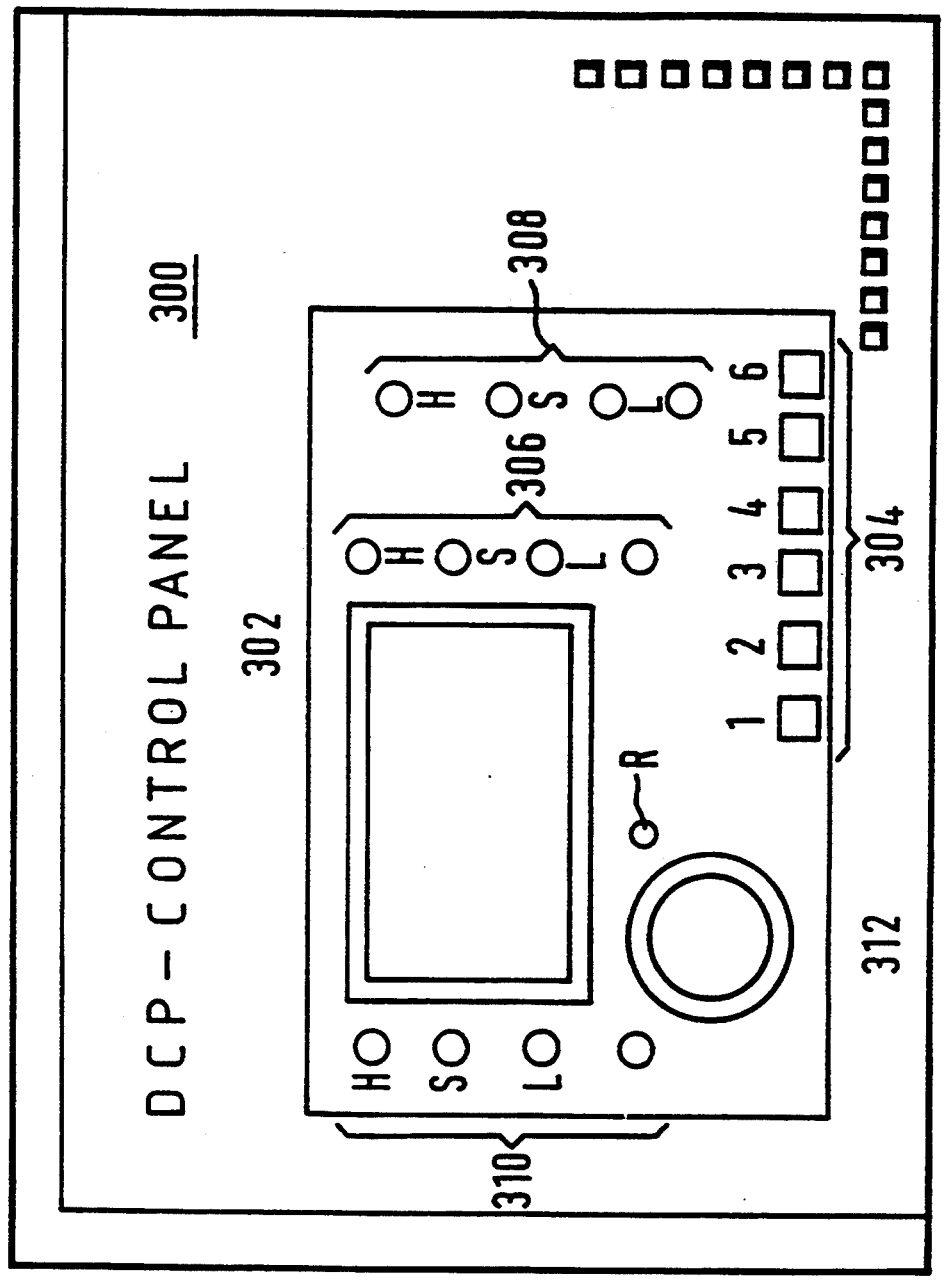
FIG. 12 is a simplified illustration of the control panel of the DCP.

The control panel 300 of the DCP is shown in FIG. 12. As seen therein, there is an electroluminescent display panel 302, which may be a color or monochrome liquid crystal display. The EL panel 302 displays the current selected parameters. Preferably the EL panel 302 is also touch-sensitive. The control panel 300 can be used in a free-standing mode to manipulate color and the other parameters that the DCP operates on. However, as in most post-production devices, the usual mode of operation will be under the control of a programmer/controller such as the POGLE.

A group of six buttons 304 correspond to the six channels that are initially available according to the preferred embodiment of the invention. A group of dials 306 (preferably rotary encoders) are provided for setting the upper boundaries of selected H, S, or L ranges, while a second group of dials 308 are provided for setting the corresponding lower bounds of the selected ranges. Extra dials are provided which can be set for detecting sharpness, location, texture, etc. Output H, S, L controls 310 are also provided to set, e.g., the amount of correction to be applied to H,S,L or another attribute.

A trackball 312 is a universal device which can point and click on any menu option. All of the above functions, including those that correspond to control buttons, are also accessible by means of the trackball, as well as via the touch screen 302 when the menu options are displayed on screen. Likewise, the trackball and/or touch screen are used to control the seventh and eighth channels which are available in the preferred embodiment of the invention, but are not initially activated upon power-up. A reset button R is also seen in FIG. 12.

F. Relative Tag RAM

Figure 8A:
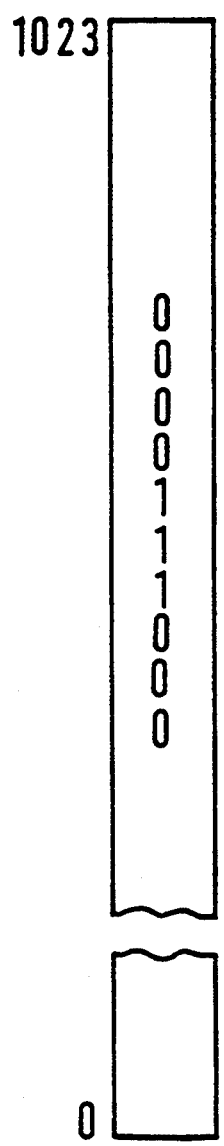
FIGS. 8A and 8B show a side-by-side comparison of a cache tag RAM containing one bit at each memory location versus a cache tag RAM containing 3-bits at each memory location.

A modification of the disclosed architecture would have a relative or "grey" tag RAM, instead of "binary". Instead of the disclosed architecture (FIG. 8A), wherein the cache tag RAM provides a binary lookup for each channel, giving the limited capability of tagging colors to "modify" or "not modify," there would be a relative or "grey" value (FIG. 8B), for example in a range of binary 0–8, at each location in the H, S and L offset tables. Relative modifications would help to avoid the possibility of a discontinuity at a boundary between colors that are modified and not modified (in the absence of a convolver or some other facility for smoothing the boundary).

The grey level cache tag RAM would avoid such a discontinuity, by marking each specific shade with an indication of how much it is to be modified. For example, mid-reds could be tagged to be strongly modified, while light and dark reds would be tagged for a slight modification. This would improve the naturalness of the resulting picture.

Figure 8B:
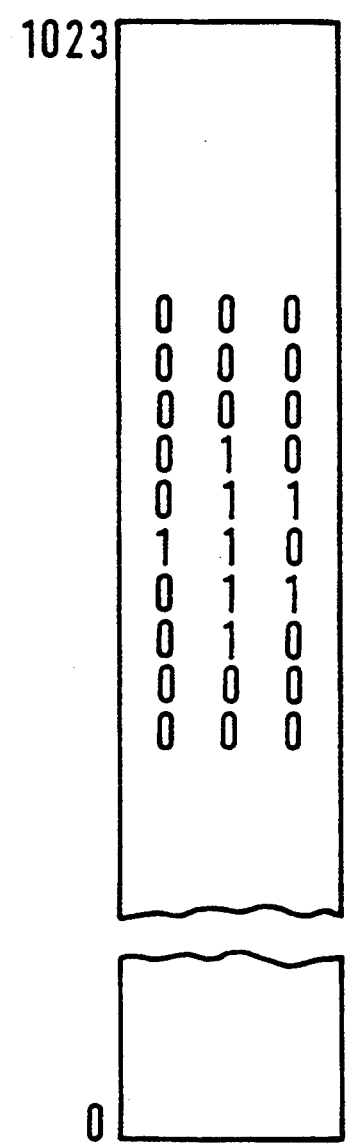
Figure 16:
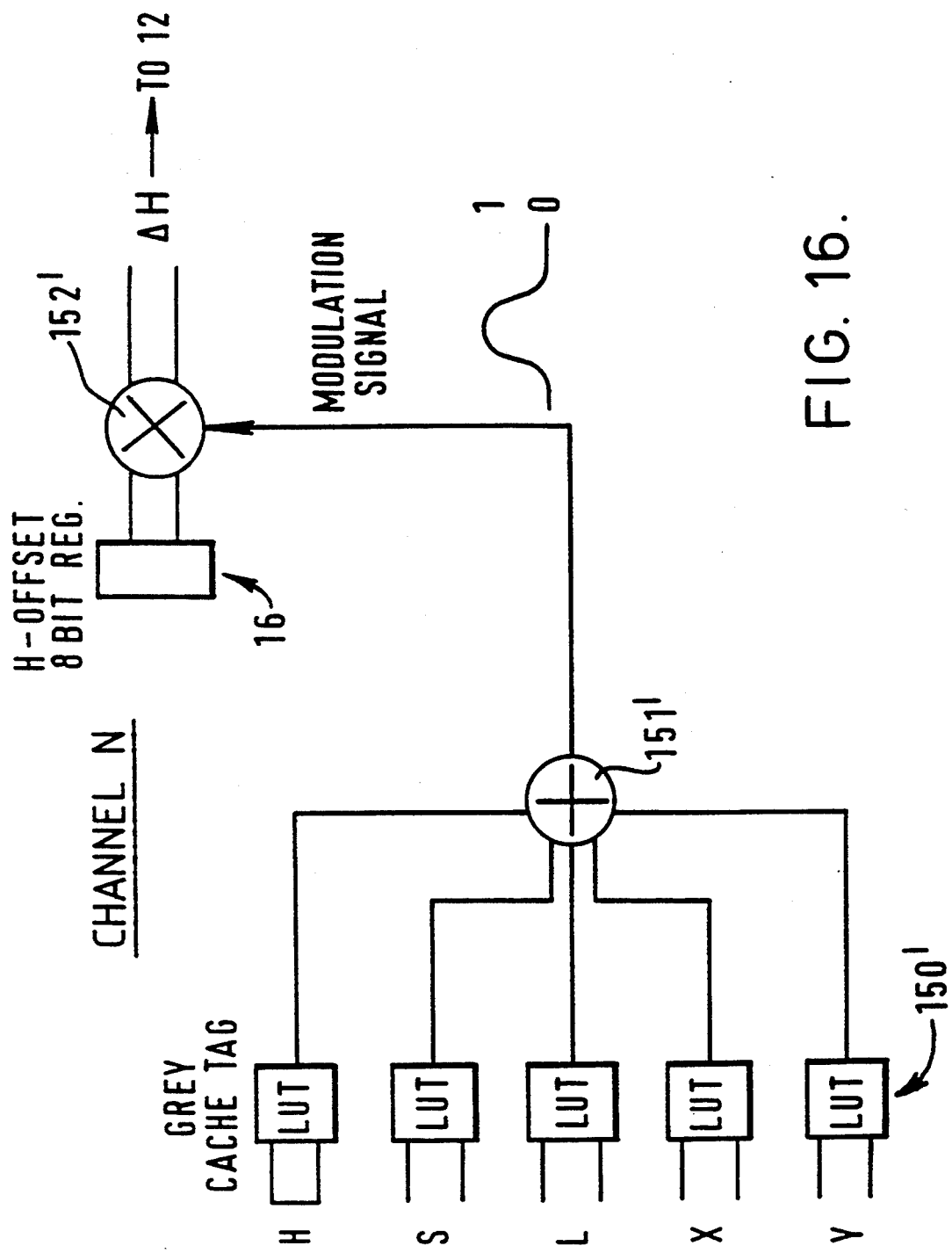
FIG. 16 is a schematic block diagram showing a first form of a relative or grey-level cache tag RAM.

FIG. 16 illustrates the operation of a relative or "grey-level" cache tag RAM of the type shown schematically in FIG. 8B.

Figure 15:
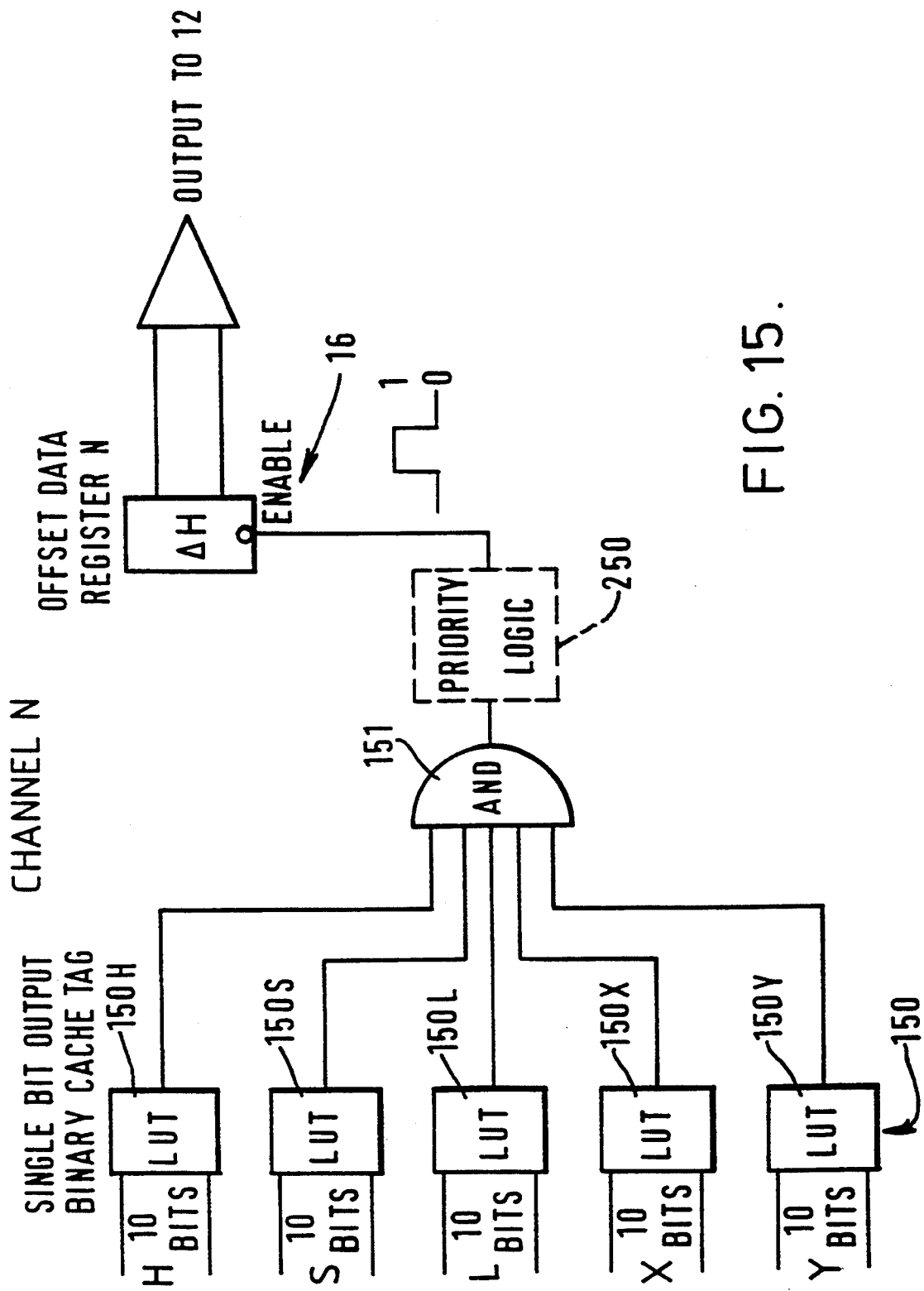
FIG. 15 is a logic diagram showing a set of cache tag RAMs corresponding to various pixel attributes for one channel, and the priority logic, in the pixel identification table 15, as well as the offset register for hue for that channel within the offset table 16.

By comparison, the preferred embodiment, as shown in FIGS. 4, 5, 8A and 15, for example, employs a binary or "tag/no tag" RAM. Pixels are either tagged for alteration or they are not tagged. Thus the output of the AND gate in FIG. 15 is either a 1 or a 0.

FIG. 15 shows the respective single-bit H,S,L,X and Y RAM's (lookup tables) 150H, 150S, . . . , that are part of a single channel N of the DCP. For a given pixel, the respective H,S,L,X and Y data for that pixel are applied to the lookup tables of channel N, and the outputs thereof are ANDed by an AND gate 151. Assuming that channel N is given priority by the priority logic (FIGS. 5 and 10), then the respective offsets in the offset data registers N, corresponding to channel N, will be outputted to the combiners 12. Only the ΔH offset register N is shown in FIG. 15. The contents of the ΔH offset register N are not modified in any way.

According to the variation in FIG. 16, in contrast with FIG. 15, a spectrum of light, medium and heavy tagging and in-between levels is provided. The H,S,L,X and Y registers tag with a byte rather than a bit, for example a 3-bit byte as shown in FIG. 8B. The outputs of the respective registers in response to a given input pixel may vary from binary 0 to 7. These outputs are added by the adder 151' to obtain a smoothly variable modulation signal. The content of the offset register 16 for the corresponding channel is, for example, a constant and is multiplied at 152' by the modulation signal to obtain the output ΔH for the combiners 12.

Figure 17:
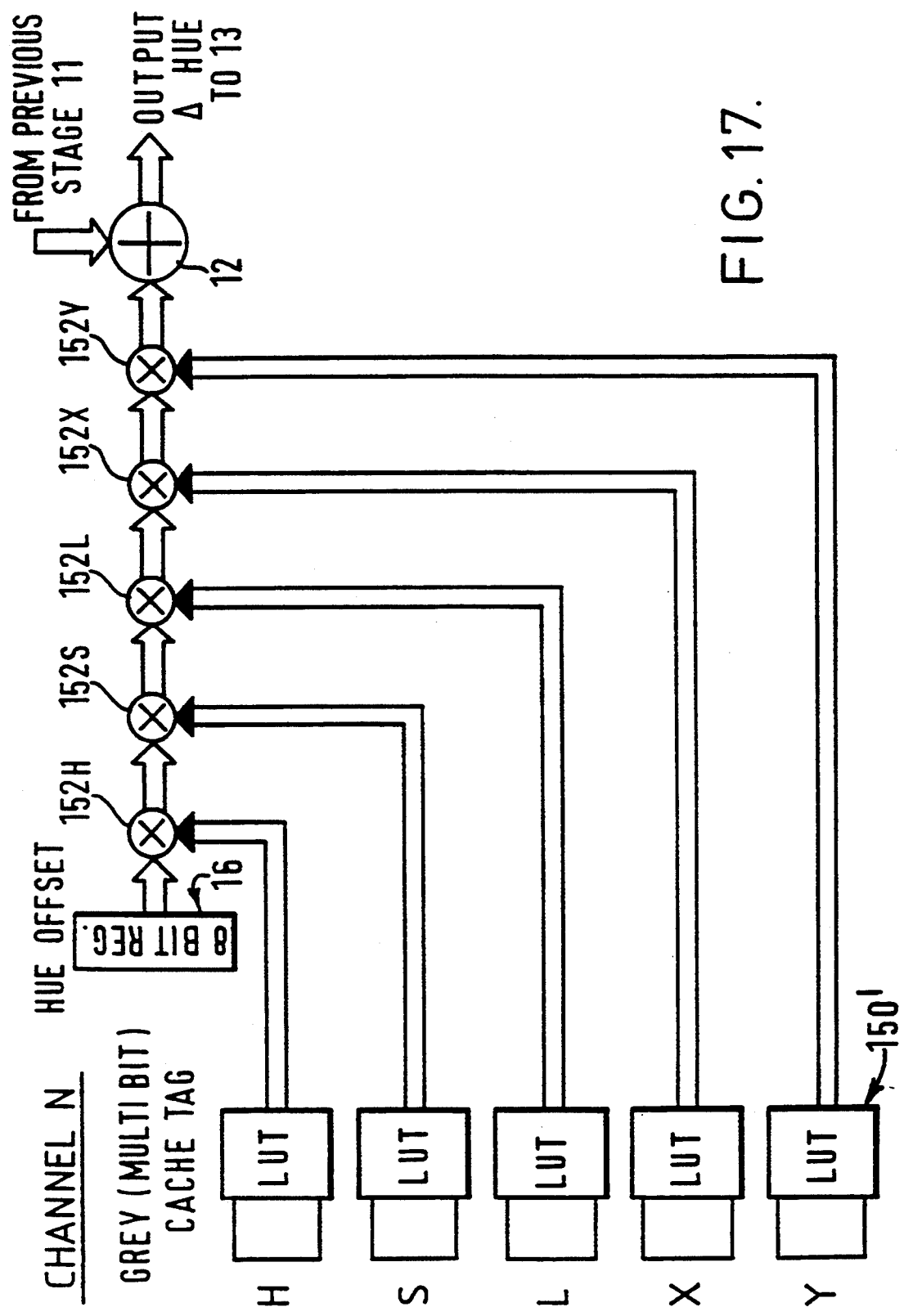
FIG. 17 is a schematic block diagram showing a second form of a relative or grey-level cache tag RAM.

A further, more complex variation is seen in FIG. 17, with cross-modulation of signal attributes. The H,S,L,X,Y registers 150' and the channel offset register 16 for channel N are the same as those in FIG. 16. However, the constant output of the offset register 16 is combined with the outputs of the registers 150' by a plurality of multipliers 152H, 152S, 152L, 152X, 152Y which are arranged in series.

The embodiments of FIGS. 16 and 17 enable the DCP to modulate the replacement hue, for example, as a function of saturation, luminance, etc. The embodiment of FIG. 17 can be expected to give finer control.

For example, in the binary pixel identification table of FIG. 15, a certain range of red hues may be selected for alteration, and other red hues will not be altered. If high ranges of saturation and luminance parameters are also selected, then since the respective hue, saturation and luminance RAM outputs are ANDed, that given range of red hues will be selected and altered only when they have, for example, high luminance and high saturation.

In contrast, in the relative or grey level cache tag RAMs in FIGS. 16 and 17, it is possible not merely to modify or not modify, but rather, to apply light, medium, or heavy modifications, or levels in between. The relative output values from the luminance and saturation RAMs in FIG. 16 will be added with the hue output value, and the resulting signal will be used to modify the contents of the offset register 16. The embodiment of FIG. 16 is somewhat less expensive, in that only one adder 151' and one multiplier 152' are required.

On the other hand, the embodiment of FIG. 17 is more expensive, requiring at least five multipliers, but is mathematically appropriate and can be expected to give finer control.

Figure 18:
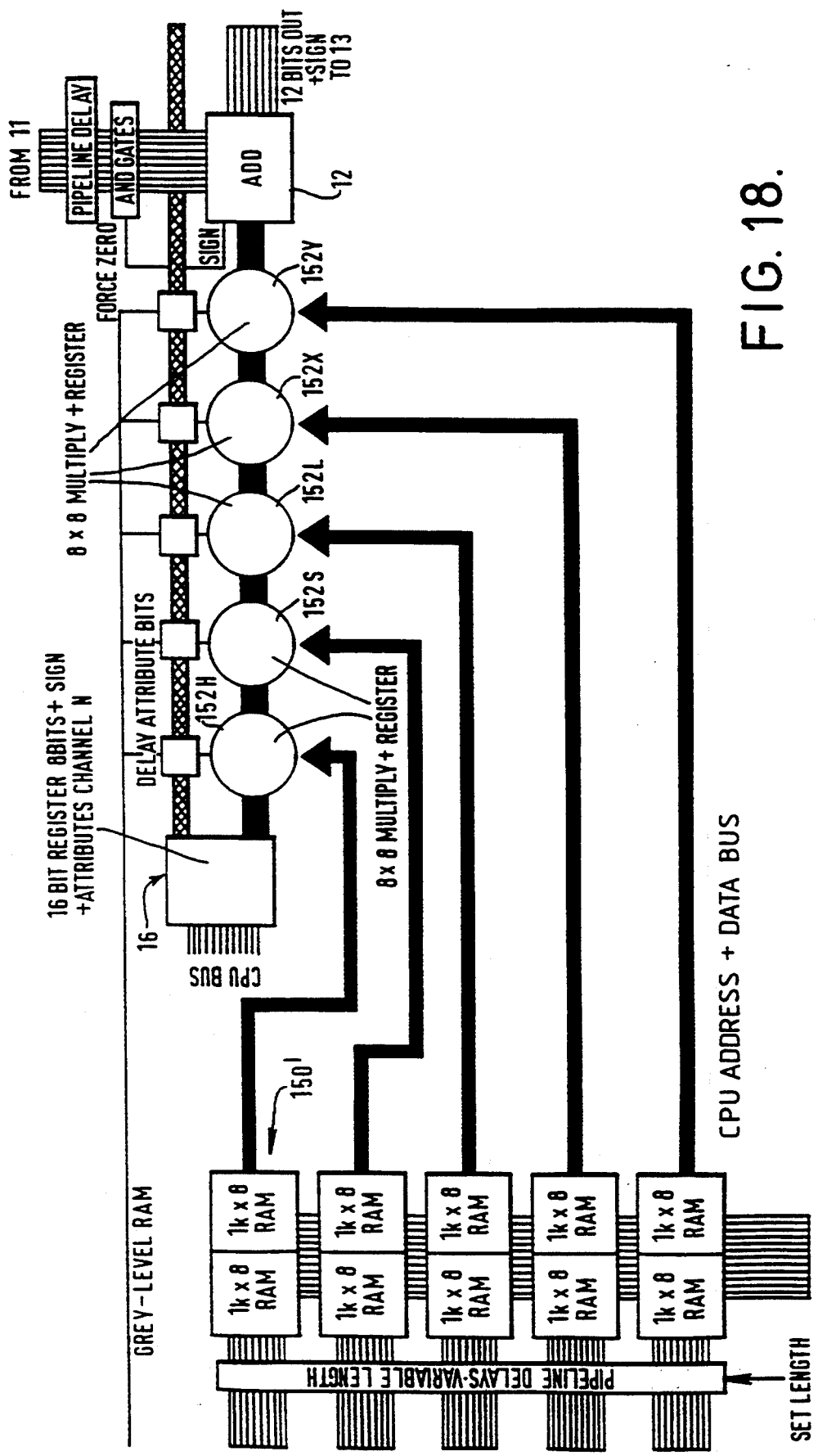
FIG. 18 is a more detailed block diagram corresponding to the arrangement of FIG. 17.

FIG. 18 shows the hardware implementation of the embodiment of FIG. 17 in more detail.

G. Offset Table

Having identified the regions to modify and not to modify with the pixel identification table 15, the amount those regions are to be modified is then specified by the offset table 16, which in this embodiment of the invention provides respective H, S, and L offsets. See FIG. 15. The offset table 16 is a series of registers which are addressed by the output from the CTR 15, only one being shown in FIG. 15.

The offset RAMs hold an H offset, S offset, and L offset for each H, S, and L value to be modified in each channel. The starting value in each register for each channel is zero. The operator can increase or decrease these values by means of rotary controls.

As a simple example, assume that a video scene contains two differently colored objects, for example a red car and a yellow car. It may be desired to change the yellow car to red, to match the color of the red car. The operator specifies the channel in which the hue of the yellow car is to be stored, and identifies the yellow car by storing the exact hue value of the yellow car within the pixel identification table 15. In practice, the operator can position a cursor on the yellow car and the hue of the yellow car will be stored automatically. Then, the operator inputs an appropriate color offset in the channel of the offset table 16 corresponding to the yellow car's channel in the pixel identification table 15. To do this, the operator selects the channel of the yellow car and rotates an appropriate control for incrementing or decrementing the hue register for that channel, until the correct value is found, such that the color of the yellow car now matches the color of the red car. Then the operator manually stores that offset value in the offset table 16 with a control on the DCP. Having set up the pixel identification table 15 and the offset register 16 in this way, the circuitry will react to each pixel having the identified yellow hue that appears within the video signal, causing the stored offset for that channel to be added to the hue value of that pixel by the adder 12. Thus the output of this stage will cause all pixels having that yellow hue to be changed to red pixels.

X and Y offsets can also be supplied if it is desired to modify the X and Y coordinates of a pixel.

The offset table can also be employed to modify the sharpness of a region, for example in response to a particular texture or sharpness detected by the texture evaluator. For that purpose, the offset table 16 would be loaded with appropriate data for setting the convolver 7a to modify the sharpness of that region, according to a known process. Such a process is performed by known Rank Cintel telecines, which employ a single number as an input to a convolver to control sharpness or softness.

One advantageous use of sharpness modifications by means of the convolver 7a might be as follows. It might be necessary to remove the "beating" of a high-frequency, shiny car radiator grill. It would be possible to detect the region to be altered (the car radiator) by its high luminance. Then, having detected that region, the convolver 7a would be supplied with data from the offset table 16 causing it to modify the sharpness of that region, to blur it slightly and remove the beating effect from the final picture.

As a further improvement on the foregoing example, it would be possible to select the radiator but avoid inadvertently selecting the sky, which also has high luminance. By ANDing the sharpness parameter and the luminance parameter, the car radiator would be selected, because it has both high luminance and high sharpness; but high-luminance, low-sharpness regions such as the sky would not be selected.

In other words, the pixel identification table 15 is loaded with data for a given channel to identify regions of high luminance. The offset table 16 is loaded with a parameter to control the degree of smoothing applied to those regions for that given channel, and that parameter is supplied to the convolver 7a and employed for smoothing the output of the DCP. In this example, it is only desirable to smooth certain areas of the picture, namely those areas that have been selected for modification. It would be undesirable to smooth the entire picture, which would make it look soft and lose picture detail. Therefore, the convolver 7a is only activated for those regions that have been selected for modification. To summarize, the pixel identification table 15 selects where to convolve, while the offset table 16 controls how much to convolve.

H. Signal Modification

These offsets are then combined with the original H, S, and L values of the original (possibly downsampled) signal by means of combiners 12, by specific rules; namely, H offsets are added, while S and L offsets are multiplied. Although these rules are not absolutely necessary to carry out the invention, it has been found experimentally that following these rules gives the most natural appearance. H corresponds to a phase angle or vector, while S and L are magnitudes. So, for example, multiplying either S or L by a modification factor of $+N\%$ will give the same apparent degree of modification for both large and small starting values of S and L, which is desirable. On the other hand, since H is a phase angle, the H modification amount should be added, not multiplied, in order to obtain results independent of the starting value.

The resultant modified H, S and L signals are then converted to modified red, green, and blue signals R′, G′ and B′ by a digital matrix and coordinate translator 13.

At this point, this modified signal could be sent direct to the output. However, that would be undesirable for at least two reasons. First, the entire video signal has been processed twice, to convert from RGB to YUV to HSL to YUV and back to RGB. Even with the use of digital circuitry, there are cumulative mathematical errors within this process that would cause distortion to the entire video signal, whether or not color-corrected. Second, as the color correction has been performed in HSL color space, it is possible that illegal combinations of color may have been introduced into the RGB signal after passing through the output matrix. In order to overcome these problems a further processing stage is used.

The output of the unit 13 is provided to a combiner 14. The combiner 14 compares the newly modified RGB signal to the original RGB signal that has not passed through the processing loop. The combiner looks for differences between the two signals and performs two separate functions simultaneously: (a) the combiner has knowledge of which pixels should have been modified, by checking the output of the pixel identification table 15. It therefore assumes that any differences, if no channel was selected, are due to mathematical errors and these can therefore be removed; and (b) the modified RGB signal (and with mathematical errors removed) is subtracted from the original RGB signal to produce an error signal.

The combiner 14 takes the values R′,G′,B′ and subtracts from them the original R,G and B from point B (or vice versa), to obtain modification signals $\Delta R$, $\Delta G$ and $\Delta B$. The modification signals are then compared with the original $\Delta H$, $\Delta S$ and $\Delta L$ by the combiner 14 so as to avoid unintended modifications. For example, if the offset signals $\Delta H$, $\Delta S$ and $\Delta L$ are zero, then no modification was intended and the $\Delta R$, $\Delta G$ and $\Delta B$ outputs from the combiner 14 are forced to zero. It is assumed that if they are non-zero, that is merely the result of small limited-precision mathematical errors that arose in the units 11–13 or elsewhere. This feature contributes substantially to keeping input signals free from corruption if they are not intended to be modified. Known ESCC's would propagate such small errors, resulting in slight modifications of the picture where none was intended.

It is these error signals $\Delta R$, $\Delta G$, $\Delta B$ which are used to modify the original clean RGB signal which is timed to then be passing through the delay stage 5.

Then these modification signals are applied to a convolver 17. A well-known convolution technique that may be employed is disclosed in William K. Pratt's book *Digital Image Processing* (John Wiley & Sons 1978), ISBN 0-471-01888-0, at 319 and 322–25, incorporated by reference. In the disclosed technique, which is only one of many available for removing noise or artifacts, each pixel is sequentially examined, and placed at the center of an imaginary $3 \times 3$, $5 \times 5$, or similar pixel array. If the L, for example, of the pixel is mathematically greater than the average of its immediate neighbors by some threshold level, it is replaced by the average value.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A digital video processor which replaces selected digital pixels in a data stream with modified pixels without replacing unselected digital pixels, comprising:

an input circuit which receives a data stream of digital pixels representative of pixels in a video picture;

a selecting circuit which receives and selects digital pixels in said data stream according to predetermined selection criteria and generates a selection signal to indicate the selection of a digital pixel if said digital pixel meets said predetermined selection criteria;

a modified pixel generating circuit which receives said selection signal and generates a respective modified digital pixel in response to each selected digital pixel according to predetermined modification parameters;

a first combining circuit which receives each said modified digital pixel from said modified pixel generating circuit, and receives said data stream including selected and unselected digital pixels from said input circuit, and replaces each said selected pixel with a respective modified pixel, to generate a modified data stream containing said unselected pixels combined with said modified pixels; and an output circuit for receiving and supplying said modified data stream as an output of said digital video processor;

wherein said input circuit receives digital high-definition pixels in said data stream at a given data rate; and said digital video processor further comprises a circuit which reduces said data rate before said selecting circuit selects said pixels.

2. A digital video processor as in claim 1, wherein said reducing means reduces said data rate in said stream by interpolation.

3. A digital video processor as in claim 1, wherein said reducing means removes pixels from said stream of pixel data.

4. A digital video processor which replaces selected digital pixels in a data stream with modified pixels without replacing unselected digital pixels, comprising:

an input circuit which receives a data stream of digital pixels representative of pixels in a video picture;

a selecting circuit which receives and selects digital pixels in said data stream according to predetermined selection criteria and generates a selection signal to indicate the selection of a digital pixel if said digital pixel meets said predetermined selection criteria;

a modified pixel generating circuit which receives said selection signal and generates a respective modified digital pixel in response to each selected digital pixel according to predetermined modification parameters;

a first combining circuit which receives each said modified digital pixel from said modified pixel generating circuit and receives said data stream including selected and unselected digital pixels from said input circuit, and replaces each said selected pixel with a respective modified pixel, to generate a modified data stream containing said unselected pixels combined with said modified pixels; and an output circuit which receives and supplies said modified data stream as an output of said digital video processor; wherein said selecting circuit and said modified pixel generating circuit have respective memories which store corresponding sets of selection criteria and modification parameters; and the modified pixel generating circuit stores respective modification parameters for each of said sets of selection criteria; and further comprising a priority deciding circuit which stores decision data indicative of which set of modification parameters will be associated with given selected pixels when said given selected pixels meet a plurality of selection criteria corresponding to a plurality of sets of selection criteria.

5. A digital video processor as in claim 4, wherein said modified pixel generating circuit comprises:

a modification data supplying circuit responsive to said selecting circuit for supplying modification data for modifying said selected pixel according to said predetermined modification parameters; and second combining means for combining said modification data and said selected pixel and thereby generating said modified pixel.

6. A digital video processor as in claim 5, wherein said digital pixels comprise data which are representative of at least hue, saturation, and luminance of said pixels; and said selecting circuit comprises:

means for storing digital selection data which indicate particular selection criteria including hue, saturation and luminance values for which corresponding pixels are to be selected; and means for comparing said digital selection data with said digital pixels to determine whether to select said pixels.

7. A digital video processor as in claim 6, wherein said selection criteria further include texture of said pixels in said video picture; and said selecting means further comprises: means for evaluating a texture of said pixels in said video picture in response to said digital pixels; and said means for storing stores digital selection data which indicate a particular texture, for which corresponding pixels are to be selected.

8. A digital video processor as in claim 5, wherein said digital pixels comprise data which are representative of at least hue, saturation, luminance, and location of said pixels; and said selecting means comprises:

means for storing digital selection data which indicate particular selection criteria including hue, saturation, luminance, and location values for which corresponding pixels are to be selected; and means for comparing said digital selection data with said digital pixels to determine whether to select said pixels.

9. A digital video processor as in claim 8, wherein said selection criteria further include texture of said pixels in said video picture; and said selecting means further comprises: means for evaluating a texture of said pixels in said video picture; and said means for storing stores digital selection data which indicate a particular texture, for which corresponding pixels are to be selected.

10. A digital video processor as in claim 5, wherein said second combining means further comprises threshold means for determining whether a difference between a modified pixel and a corresponding selected pixel data is below a predetermined threshold, and if so, not supplying said modified pixel so that said selected pixel is not replaced.

11. A digital video processor as in claim 10, wherein said threshold means determines a difference between said modified pixel and said selected pixel, and disregards said modified pixel if said difference is below said predetermined threshold.

12. A digital video processor as in claim 5, wherein said output circuit comprises first smoothing means for receiving said output data from said first combining circuit, detecting whether first transition values between respective pixels corresponding to said output data exceed predetermined first transition limits, and if so, reducing said first transition values in said output data.

13. A digital video processor as in claim 12, further comprising second smoothing means for receiving said modified pixels from said second combining means, detecting whether second transition values between respective modified pixels exceed predetermined second transition limits, and if so, reducing said second transition values.

14. A digital video processor as in claim 13, wherein said first and second smoothing means each comprise a convolver.

15. A digital video processor as in claim 5, further comprising smoothing means for receiving said modified pixels from said second combining means, detecting whether transition values between respective modified pixels exceed predetermined transition limits, and if so, reducing said transition values.

16. A digital video processor as in claim 15, wherein said smoothing means comprises a convolver.

17. A digital video processor as in claim 4, wherein said selecting circuit tests individual pixels according to said predetermined selection criteria.

18. A digital video processor as in claim 4, wherein said selecting circuit tests predefined groups of pixels according to said predetermined selection criteria.

19. A digital video processor for modifying a data stream comprising digital pixels and outputting a modified data stream comprising modified pixels, the digital video processor comprising:
an input circuit which receives a data stream of digital pixels which define pixels in a video picture according to a first coordinate system;
a first converter for receiving and converting said digital pixels to a second coordinate system having data for each digital pixel respectively corresponding to hue, saturation and luminance of said pixel;
a selecting circuit which receives said data stream from said first converter and selects said digital pixels in said data stream according to predetermined selection criteria, and generates a selection signal to indicate the selection of a digital pixel if said digital pixel meets said predetermined selection criteria;
a modification circuit which receives said selection signal and generates a respective modification signal in response to each selected digital pixel according to predetermined modification parameters within said second coordinate system;
a second converter for converting each said modification signal from said second to said first coordinate system;
a first combining circuit which receives each said modification signal from said modification circuit, and receives said data stream from said input circuit, and modifies each said selected pixel in response to said modification signal, to thereby generate a modified data stream containing digital pixels which define a modified video picture according to said first coordinate system; and
an output circuit for receiving and supplying said modified data stream as an output of said digital video processor.

20. A digital video processor as in claim 19, wherein said selecting circuit tests individual pixels according to said predetermined selection criteria.

21. A digital video processor as in claim 19, wherein said selecting circuit tests predefined groups of pixels according to said predetermined selection criteria.

22. A digital video processor as in claim 19, wherein said input circuit comprises a third converter which receives and converts said data stream from said first coordinate system to a third coordinate system, and a fourth converter which receives and converts said data stream from said third coordinate system to said first coordinate system.

23. A digital video processor as in claim 22, wherein said output circuit comprises a fifth converter which receives and converts said data stream from said first coordinate system to a third coordinate system, and a sixth converter which receives and converts said data stream from said third coordinate system to said first coordinate system.

24. A digital video processor as in claim 22, wherein said first coordinate system is RGB.

25. A digital video processor as in claim 24, wherein said third coordinate system is YUV.

26. A digital video processor as in claim 22, wherein said third coordinate system is YUV.

27. A digital video processor as in claim 19, wherein said output circuit comprises a fifth converter which receives and converts said data stream from said first coordinate system to a third coordinate system, and a sixth converter which receives and converts said data stream from said third coordinate system to said first coordinate system.

28. A digital video processor as in claim 27, wherein said third coordinate system is YUV.

29. A digital video processor for modifying a data stream comprising digital pixels and outputting a modified data stream comprising modified pixels, the digital video processor comprising:
an input circuit which receives a data stream of digital pixels representative of pixels in a video picture;
a selecting circuit which receives and tests digital pixels in said data stream according to predetermined selection criteria, said selection criteria including a plurality of predetermined sets of independent picture attributes and generates a selection signal to indicate the selection of a digital pixel if said digital pixel has all of said picture attributes in one of said sets;
a modification circuit which receives said selection signal and generates a respective modification signal in response to each selected digital pixel according to predetermined modification parameters;
a first combining circuit which receives each said modification signal from said modification circuit, and receives said data stream from said input circuit, and modifies each said selected pixel in response to said modification signal, to thereby generate a modified data stream which defines a modified video picture; and an output circuit for receiving and supplying said modified data stream as an output of said digital video processor.

30. A digital video processor as in claim 29, wherein said modification circuit further comprises a priority circuit, wherein:

said priority circuit detects when said selecting circuit generates a plurality of said selection signals, in response to one digital pixel having the predetermined picture attributes in a corresponding plurality of said sets of attributes, and said priority circuit controls an order in which said modification circuit employs the modification parameters corresponding to said selection signals for generating said modification signal.

31. A digital video processor as in claim 29, wherein said selecting circuit tests individual pixels according to said predetermined selection criteria.

32. A digital video processor as in claim 29, wherein said selecting circuit tests predefined groups of pixels according to said predetermined selection criteria.

* * * * *